United States Patent
Batchko

(10) Patent No.: US 10,247,968 B2
(45) Date of Patent: *Apr. 2, 2019

(54) CONVECTIVE MOTION LAMPSHADE

(71) Applicant: Robert G. Batchko, Santa Monica, CA (US)

(72) Inventor: Robert G. Batchko, Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/384,128

(22) Filed: Dec. 19, 2016

(65) Prior Publication Data

US 2017/0123238 A1    May 4, 2017

Related U.S. Application Data

(63) Continuation of application No. 14/171,658, filed on Feb. 3, 2014, now Pat. No. 9,523,478, which is a (Continued)

(51) Int. Cl.
*F21V 1/00* (2006.01)
*F21V 1/26* (2006.01)
(Continued)

(52) U.S. Cl.
CPC ............ *G02F 1/0147* (2013.01); *A41D 27/08* (2013.01); *E06B 7/28* (2013.01); *F21S 6/001* (2013.01);
(Continued)

(58) Field of Classification Search
CPC . B60Q 1/30; B60Q 1/32; B60Q 1/323; B60Q 1/56; B60Q 3/12; F21S 10/007; F21S 10/02; F21S 6/00; F21S 10/00; F21S 10/002; F21V 1/00; F21V 3/02; F21V 31/00; F21V 9/00; F21V 9/10; F21V 9/12; F21V 29/58; F21V 29/90; F21W 2121/00; F21Y 2101/02; F21Y 2113/10; F21Y 2115/10; F24C 3/00; G09F 13/24;
(Continued)

(56) References Cited

U.S. PATENT DOCUMENTS 1,614,004 A * 1/1927 Larson ...................... F21V 3/00
                                                    362/318
2,448,318 A * 8/1948 Lowry .................... F21V 33/00
                                                    362/101
(Continued)

FOREIGN PATENT DOCUMENTS

GB     1363645 A    8/1974
GB     2314444 A    12/1997
JP     H08115087 A   5/1996

OTHER PUBLICATIONS

Co-pending U.S. Appl. No. 60/509,977, to Robert G. Batchko, filed Oct. 9, 2003.
(Continued)

*Primary Examiner* — Hargobind S Sawhney
(74) *Attorney, Agent, or Firm* — JDI Patent; Joshua D. Isenberg; Robert Pullman

(57) ABSTRACT

An apparatus that is part of a lampshade comprises a first film, a second film and a border seal forming a closed chamber that is laminar in shape and hermetically sealed. A fluid is disposed for fluid motion in the closed chamber.

36 Claims, 17 Drawing Sheets

Related U.S. Application Data continuation of application No. 10/962,386, filed on Oct. 9, 2004, now Pat. No. 8,641,214.

(60) Provisional application No. 60/509,977, filed on Oct. 9, 2003.

(51) Int. Cl.

| | | |
|---|---|---|
| *G02F 1/01* | (2006.01) | |
| *F21V 9/40* | (2018.01) | |
| *F21V 33/00* | (2006.01) | |
| *F21V 35/00* | (2006.01) | |
| *F21S 6/00* | (2006.01) | |
| *F21S 10/00* | (2006.01) | |
| *F21V 9/12* | (2006.01) | |
| *G02B 1/06* | (2006.01) | |
| *A41D 27/08* | (2006.01) | |
| *E06B 7/28* | (2006.01) | |
| *F21W 121/06* | (2006.01) | |
| *F21W 121/00* | (2006.01) | |

(52) U.S. Cl.
CPC .............. *F21S 10/002* (2013.01); *F21V 1/00* (2013.01); *F21V 1/26* (2013.01); *F21V 9/12* (2013.01); *F21V 9/40* (2018.02); *F21V 33/0008* (2013.01); *F21V 35/00* (2013.01); *G02B 1/06* (2013.01); *G02F 1/0107* (2013.01); *F21W 2121/00* (2013.01); *F21W 2121/06* (2013.01)

(58) Field of Classification Search
CPC ...... G09F 13/04; G09F 13/0413; G09F 13/10; G09F 13/14; G09F 13/16; G09F 13/18; G09F 2013/222; G09F 7/00; B44C 3/025; B44C 5/04; B44F 1/066; G02B 1/06; G02B 5/136; G02F 1/0147; G02F 1/13; G02F 1/1333; G02F 1/1341

See application file for complete search history.

(56) References Cited

U.S. PATENT DOCUMENTS

| | | | |
|---|---|---|---|
| 3,056,019 A | 9/1962 | William et al. | |
| 3,077,697 A | 2/1963 | Fry | |
| 3,101,564 A | 8/1963 | Stoessel | |
| 3,232,272 A | 2/1966 | De Jose et al. | |
| 3,276,428 A | 10/1966 | Burch | |
| 3,288,110 A | 11/1966 | Jerome et al. | |
| 3,387,396 A | 6/1968 | Smith | |
| 3,570,156 A * | 3/1971 | Walker | F21S 10/002 40/406 |
| 3,706,149 A | 12/1972 | Olivieri | |
| 3,964,194 A | 6/1976 | Gugeler | |
| 3,987,786 A | 10/1976 | Keyes et al. | |
| 4,034,493 A * | 7/1977 | Ball | B44F 1/066 40/406 |
| 4,057,921 A | 11/1977 | Ball | |
| 4,120,265 A | 10/1978 | Davis | |
| 4,170,035 A | 10/1979 | Walker | |
| 4,323,032 A | 4/1982 | Halfon | |
| 4,346,963 A * | 8/1982 | Kobale | G02F 1/13394 349/122 |
| 4,380,994 A | 4/1983 | Seemann | |
| 4,395,835 A | 8/1983 | Schneider | |
| 4,539,630 A | 9/1985 | Shew | |
| 4,682,858 A | 7/1987 | Kanbe et al. | |
| 4,686,784 A | 8/1987 | Smithies | |
| 4,742,439 A | 5/1988 | Choate | |
| 4,747,538 A | 5/1988 | Dunn et al. | |
| 4,851,112 A | 7/1989 | Schlensker | |
| 4,939,859 A | 7/1990 | Bradt | |
| 4,944,969 A | 7/1990 | Usui | |
| 5,090,357 A | 2/1992 | Pucci | |
| 5,106,660 A | 4/1992 | Vorel | |
| 5,165,781 A | 11/1992 | Orak | |
| 5,291,674 A | 3/1994 | Torrence | |
| 5,349,771 A | 9/1994 | Burnett | |
| 5,466,373 A | 11/1995 | Handwerker et al. | |
| 5,506,762 A | 4/1996 | Ziegler et al. | |
| 5,709,454 A | 1/1998 | Leif | |
| 5,717,283 A | 2/1998 | Biegelsen et al. | |
| 5,778,576 A | 7/1998 | Kaviani | |
| 5,803,580 A | 9/1998 | Tseng | |
| 5,938,318 A * | 8/1999 | Mattsen | F21S 10/002 362/101 |
| 6,187,394 B1 | 2/2001 | Johnson et al. | |
| 6,279,835 B1 | 8/2001 | Hansen | |
| 6,311,898 B1 | 11/2001 | Gruff | |
| 6,318,010 B1 | 11/2001 | Tsai | |
| 6,443,099 B1 | 9/2002 | Boggs | |
| 6,447,137 B1 | 9/2002 | Long | |
| 6,461,014 B1 | 10/2002 | Lin | |
| 6,464,368 B1 | 10/2002 | Chen | |
| 6,539,654 B2 | 4/2003 | Lin | |
| 6,604,835 B2 | 8/2003 | Zale | |
| 6,612,053 B2 | 9/2003 | Liao | |
| 6,681,508 B2 | 1/2004 | Unger et al. | |
| 6,746,131 B1 | 6/2004 | Goldstein et al. | |
| 6,865,833 B2 | 3/2005 | Kliakhandler et al. | |
| 6,971,586 B2 | 12/2005 | Fisher | |
| 7,210,809 B2 | 5/2007 | Blackstock | |
| 7,243,613 B2 | 7/2007 | Holms et al. | |
| 7,310,900 B2 | 12/2007 | Huang | |
| 7,717,581 B2 | 5/2010 | Lin et al. | |
| 7,798,673 B2 | 9/2010 | Yang | |
| 8,641,214 B1 | 2/2014 | Batchko | |
| 9,523,478 B1 | 12/2016 | Batchko | |
| 2003/0202340 A1 | 10/2003 | Wu | |
| 2006/0105091 A1 | 5/2006 | Kwan | |

OTHER PUBLICATIONS

Final Office Action for U.S. Appl. No. 10/962,386, dated May 6, 2011.
Final Office Action for U.S. Appl. No. 10/962,386, dated Nov. 17, 2009.
Final Office Action for U.S. Appl. No. 14/171,658, dated Apr. 1, 2016.
Merriam Webster Online Dictionary entry for "lamina" [online], [retrieved on Jan. 24, 2009]. Retrieved from the Internet, <URL: http://www.merriam-webster.com/dictionary/lamina>.
Merriam Webster Online Dictionary entry for "laminar" [online], [retrieved on Jan. 24, 2009]. Retrieved from the Internet, <URL: http://www.merriam-webster.com/dictionary/laminar>.
Non-Final Office Action for U.S. Appl. No. 10/962,386, dated Jul. 24, 2008.
Non-Final Office Action for U.S. Appl. No. 10/962,386, dated Mar. 5, 2013.
Non-Final Office Action for U.S. Appl. No. 10/962,386, dated Nov. 24, 2010.
Non-Final Office Action for U.S. Appl. No. 14/171,658, dated Sep. 23, 2015.
Scrubbing Out Sea life, Exfoliating plastic beads feel good—unless you live in the ocean. Hilary Rosner, Jun. 16, 2008 <downloaded from the internet http://www.slate.com/id/2193693/> downloaded on Feb. 17, 2011.

* cited by examiner

CONVECTIVE MOTION LAMPSHADE

FIELD OF THE INVENTION

This invention relates to motion displays, and more specifically to liquid motion displays.

BACKGROUND OF THE INVENTION

Liquid motion lamps, a type of novelty display, may include a sealed transparent container that holds a colorful fluid. The fluid may include a number of immiscible components such as dyed liquids, solids and gases. The fluid may be circulated or agitated within the container to produce random flow patterns and interesting visual effects. Various techniques have been used for creating desired motion in the fluid. One common method utilizes natural convection wherein a light bulb or electric heater is used to warm the fluid. Other methods incorporate motors or pumps to force motion in the fluid.

A popular design for a liquid motion lamp, such as the Lava® brand motion lamp manufactured by Haggerty Enterprises, Inc., Chicago, Ill., is based on natural convection and uses a fluid that may include water and paraffin wax. The fluid is sealed within a glass bottle that rests on a solid base. An incandescent light bulb is concealed within the base and heats and illuminates the fluid through the glass bottle and an opening in the base. The wax undergoes a continuous solid-to-liquid-to-solid phase transition as it is heated and cooled thus causing it to rise and fall within the water. Interesting visual effects result from the motion of the wax.

However, due to the large thermal mass of the device, the start-up time is approximately two hours resulting in a long period of inactivity and poor electrical efficiency. Efforts have been made to reduce the size of the lamp, however its miniaturization is limited by practicality—it should be large enough to be viewable from anywhere in an average sized room. Further, the device weighs approximately two kilograms thus increasing its cost and limiting its utility. Still further, the choice of a glass bottle for a container limits the ruggedness of the device. Additionally, the device sustains a luminous flux sufficient to illuminate the fluid but substantially less than that of a typical household light fixture—rendering it unsuitable for general use in room lighting.

There is therefore a need for a liquid motion display that has a short warm-up time and is efficient, lightweight, inexpensive, rugged, and bright.

BRIEF DESCRIPTION OF THE DRAWINGS

The teachings of the present invention can be readily understood by considering the following detailed description in conjunction with the accompanying drawings, in which.

DETAILED DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention. Like numbers refer to like elements throughout.

Figure 1:
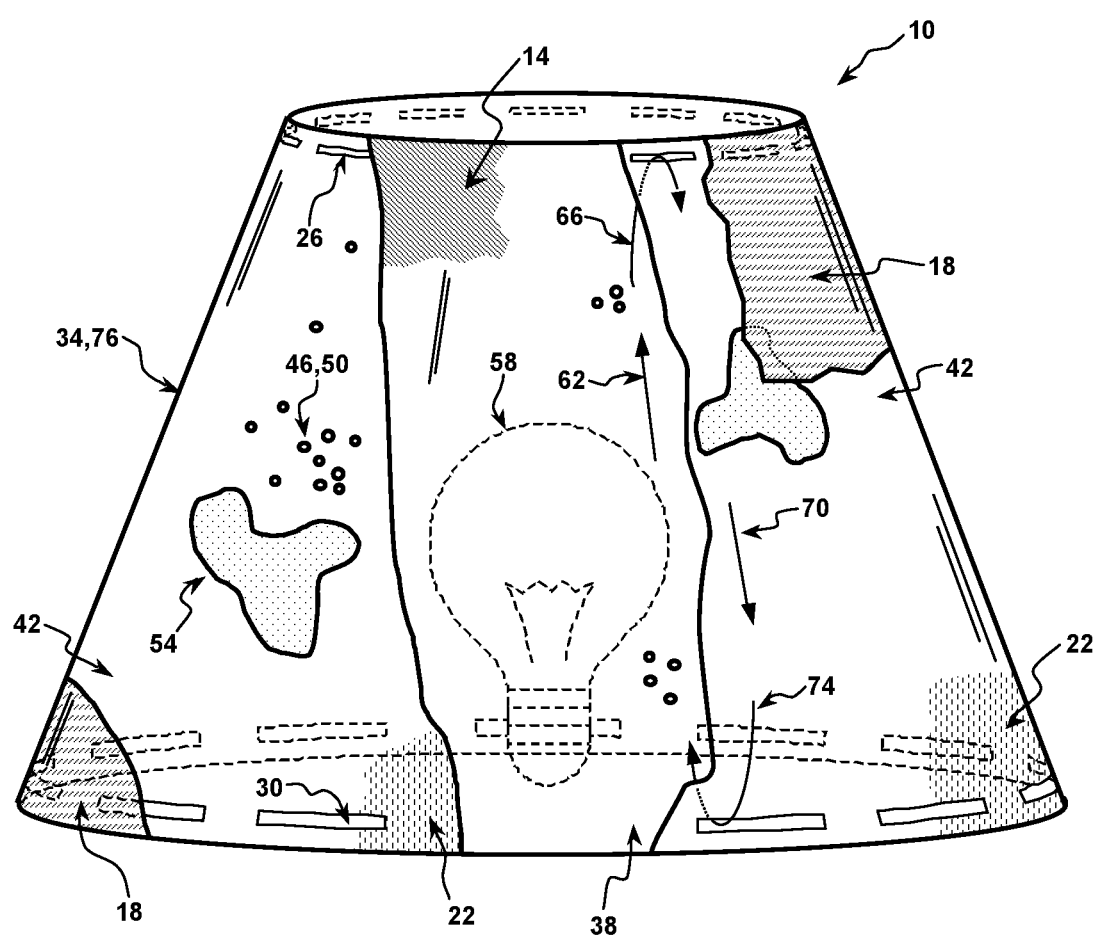
FIG. 1 depicts a laminar liquid motion display in accordance with a preferred embodiment of the present invention.

The present invention can be better understood with reference to FIG. 1, which depicts a laminar liquid motion display 10. The display 10 includes a first outer film 14, a second outer film 18 and a flow separator film 22. Outer films 14,18 are at least partially translucent or transparent to light and heat (not shown). Flow separator film 22 may be least partially translucent or transparent to light and at least partially reflective to heat and may serve as an insulator. Light may include visible light or electromagnetic radiation in general. Heat may include thermal and infrared radiation, vibrational energy and other forms of heat in general.

Flow separator film 22 includes one or more upper flow holes 26 and one or more lower flow holes 30. Upper flow holes 26 are disposed along at least a portion and in the proximity of the upper border of flow separator film 22. Lower flow holes 30 are disposed along at least a portion and in the proximity of the lower border of flow separator film 22. Flow separator film 22 is sandwiched between outer films 14,18. A border seal (not shown) binds at least a portion of films 14,18,22 together along their periphery thereby forming a generally thin chamber 34. Films 14,18, 22 may be sealed by heat, adhesive, cement, pressure, welding, web coating, lamination or other techniques used for sealing films including methods of packaging. Preferably, films 14,18,22 are sealed hermetically or near-hermetically, although they may be alternatively sealed non-hermetically. In this fashion, chamber 34 includes a first generally thin compartment 38 and a second generally thin compartment 42. First compartment 38 may be defined as a portion of the space in between first outer film 14 and flow separator film 22. Second compartment 42 may be defined as a portion of the space in between flow separator film 22 and second outer film 18. Compartments 38,42 are in communication with each other via flow holes 26,30. Films 14,18,22, compartments 38,42 and chamber 34 are generally thin and may have generally any thickness; additionally the thickness may range from less then 1 micron to greater than 1 cm.

A heat transfer fluid 46 is disposed within chamber 34 and may circulate within chamber 34 through compartments 38,42 and flow holes 26,30. Fluid 46 may include any number of generally immiscible components 50,54. Fluid 46 and immiscible components 50,54 may be in the form of suspensions, solutions, colloidal solutions, emulsions, dispersions and/or mixtures. Fluid 46 and immiscible components 50,54 may include liquids, solids, gases or plasmas including mineral oil, benzyl alcohol, sodium chloride, potassium chloride, salts, liquid paraffin, paraffin wax, paraffin oil, napthene, water, isopropyl alcohol, silicone oil, melamine formaldehyde, nanoparticles, microspheres, fluorescent or phosphorescent liquids solids and gases, polystyrene, superparamagnetic microspheres, magnetic microspheres, paramagnetic microspheres, protein-coated microspheres, acrylic, beads, droplets, glitter, metallic particles, pieces of plastic film, polyester glitter, mineral spirits, xylene, toluene, carbon tetrachloride, dyes, ethanol, surfactants, surface tension reducing agents, solvents, emulsifiers, glycerol, ethylene glycol, polyethylene glycol (aka PEG), plastic, glass, metal and silica, polymer, liquid crystal, dielectric liquid, perfluorinated carbon liquid or, anti-freeze. Immiscible components 50,54 may be chosen for their properties including photosensitivity, dispersion, index of refraction, color, viscosity, coefficient of thermal expansion, surface tension, density, water solubility, toxicity, odor, and fluorescence, other physical and optical properties. Immiscible components 50,54 may be dyed, tinted, painted, anodized or colored with different colors for enhancing the visual effects as they circulate inside chamber 34.

One or more air gaps (not shown) may be provided in chamber 34 to allow for thermal expansion of fluid 46.

A lamp 58 may be disposed in the proximity of chamber 34 and provides radiation (not shown) to fluid 46. Lamp 58 serves to illuminate at least a portion of fluid 46 and power at least a portion of its motion by natural convection. Lamp 58 may include one or more light bulb, candle flame, electroluminescent, fluorescent or phosphorescent material or device, light emitting diode, laser, the sun, or other sources of heat and light. Radiation (not shown) may include light, electromagnetic radiation, visible-, infrared and ultraviolet light, thermal radiation, conducted-, convected or radiated heat. At least a portion of the flow of fluid 46 is generally indicated by arrows 62,66,70,74. In this fashion, first compartment 38 may be disposed proximally to lamp 58 functioning similarly to a heat collector in a thermosiphon (aka thermosyphon) wherein heat may be collected and transferred to fluid 46. Further, second compartment 42 may be disposed distally to lamp 58 thereby functioning similarly to a condenser or cooling tank in a thermosiphon wherein the collected heat may be dissipated. The flow 62,66,70,74 of fluid 46 may also be similar to that of convective roll.

The direction of flow, or flow pattern, of fluid 46, given by arrows 62,66,70,74, is dependent on parameters that include the physical properties of fluid 46. By way of convention in this description, an arbitrary direction is used wherein, for example, a portion of fluid 46 rises (generally indicated by upward pointing arrow 62) upon being heated in compartment 38. Similarly, fluid 46 falls (generally indicated by downward pointing arrow 70) upon cooling in compartment 42. As one example of how the direction of arrows 62,66,70,74 may be reversed with respect to the position of lamp 58, fluid 46 may include one or more components with negative coefficients of thermal expansion (such as water at around 4 degrees C.). In this fashion, the density of a portion of fluid 46 may increase upon heating and decrease upon cooling, whereby its direction flow may be reversed from that indicated by arrows 62,66,70,74.

Chamber 34 may be curved concentrically around lamp 58 and may form a generally closed surface 76. In this fashion, chamber 34 may additionally provide the functionality similar to that of a lampshade and filter a portion of the light (not shown) that is emitted from lamp 58. Additionally, other closed or open surface shapes may be desirable, including spheres, hemispheres, cylinders, cones, frusto-cones (aka truncated cones), helixes, mobius strips and other symmetric and asymmetric shapes. Lamp 58 may be disposed in the proximity of the axis (not shown) of surface 76 for providing generally uniform heating and illumination to fluid 46. Likewise, it may be desirable to dispose lamp 58 in an off-axis fashion with respect to surface 76. In this fashion, lamp 58 may provide non-uniform heat and illumination of fluid 46. For some chamber topologies, morphologies or shapes, such as a frusto-cone, fluid 46 may encounter pressure gradients or other forces (not shown) resulting in vortices, turbulence and other random, laminar or non-laminar flow patterns (not shown).

Further, for some chamber topologies or designs, display 10 may include an axis of symmetry (not shown) that is normal to the force of gravity (not shown) and in the plane of chamber 34. In this fashion, display may be capable of operating even when rotated by 180 degrees about its axis of symmetry.

Films 14,18,22 may include thermosplastics, polycarbonate, resins, thermosets, and elastomers, including low- and high-density polyethylene, polypropylene, PIFE, polystyrene, PMMA, nylon, polyester, Mylar®, vinyl, polyvinyl chloride (PVC), acrylic polymer, epoxy, phenolformaldehyde, glass, plastic, transparent polyarylsulfone, polyamide and thermoplastic polyester and polymethylpentene, fluorinated ethylene, propylene polymers, metal, combinations of these materials with each other and with other transparent, transluscent or opaque materials, or any other plastics or combinations or laminates of plastics or packaging materials including ones that are suitable for forming a hermetic or near-hermetic seal around fluid 46. Films 14,18,22 may be chosen for their physical properties including thickness, free shrinkage, UV stability, tensile strength, elongation, tear strength, specific gravity, hardness, color, opacity, chemical resistance, thermal stability, water absorption, surface energy, melting point, coefficient of thermal expansion, thermal mass, specific heat, ability to collect, store and dissipate heat and other properties. Additionally, at least a portion of films 14,18,22 and fluid 46 may include colored, fluorescent, or phosphorescent materials. Further, films 14,18,22 and fluid 46 may be chosen for their optical properties. Optical properties may include refraction, diffraction, polarization, reflection, absorption, transmission, scattering, nonlinearity, dispersion, waveguiding, photosensitivity, electro-optic coefficient, birefringence, optical rotation, depolarization and optical activity. Yet further, films 14,18,22 may include specialty materials including holograms and holographic film, edge-illuminated films, waveguides, lightguides, and films that have been colored, tinted, dyed, patterned, metallized, etched, printed, painted, inscribed or marked in any fashion.

Display 10 has thus far been described for viewing in transmission mode wherein at least a portion of display 10 is disposed between lamp 58 and an observer (not shown).

Alternatively, display 10 may be viewed in reflection mode wherein an observer (not shown) may view display 10 from the same side of display 10 that lamp 58 is disposed. For operation in reflection mode it may be desirable that at least a portion of films 14,18,22 may include one or more surfaces that are at least partially reflective or opaque to light. Further, lamp 58 may include any number of separate sources of light and heat. For example, lamp 58 may include a heat source (such as an electric heater, the sun, a candle flame or living organism) disposed on one side of display 10, and a light source (such as a light bulb, candle flame, laser, light emitting diode or the sun) disposed on the other side of display 10.

One or more optional support structures (not shown) may be disposed within, in contact with or in the proximity of films 14,18,22 for providing structural support or reinforcement to chamber 34. Support structures may additionally serve to provide heat collection, storage or dissipation. Further, chamber 34 may be adjoined to lamp 58 by a support structure (not shown).

Flow holes 26,30 may be disposed in a number of shapes, sizes and arrangements including slots, openings, round holes, perforations, gaps, slots, slits, cut-outs, and any other geometries that the permits the flow of at least a portion of fluid 46 within chamber 34 and between compartments 38,42. Optionally, flow holes 26,30 may include flow control structures (not shown) including valves, flaps, nipples, unidirectional valves and nozzles for further directing and controlling the flow of at least a portion of fluid 46 within chamber 34 between compartments 38,42.

Additional lamps (not shown) may be disposed in within, in contact with or in the proximity of display 10. Additional lamps (not shown) may provide additional light or heat (both not shown) serving to illuminate or enable convection in display 10. Additional lamps (not shown) may include lamps, light bulbs, light emitting diodes, lasers, the sun and electroluminescent, fluorescent or phosphorescent materials or devices or other sources of light or heat.

Alternatively, it may be desirable that display be constructed and operated without the inclusion of flow separator film 22. In this fashion, chamber 34 may include a single compartment (not shown) and at least a portion of fluid 46 may put into motion by convection. However, in this case, the flow pattern of fluid 46 may include unstable convection or other flow patterns (not shown) generally different from that indicated by arrows 62,66,70,74.

Chamber 34 may include a number of surface tension breaking objects (not shown). Surface tension breaking objects (not shown) may assist in breaking the surface tension of at least a portion of fluid 46 thereby enabling at least a portion of fluid 46 to collect into globules of larger size. Surface tension breaking objects (not shown) may include coils, strips, spikes, pieces and objects having other shapes and patterns, and objects made from metal, glass, plastic or other materials having high surface tension or other physical properties related to surface energy or surface tension.

Possible materials for the present invention may include the following:
  lamp 58 may include a common household type incandescent light bulb;
  first and second outer films 14,18 may include transparent Mylar® or polyester film, or a polyester/PVC laminate film;
  first outer film 14 may also include a white translucent Mylar®, polyester or polyester/PVC laminate film for providing white diffuse background lighting in order to uniformly radiate or illuminate at least a portion of fluid 46;
  flow separator film 22 may include partially metalized Mylar® or polyester film, or a polyester/PVC laminate film such as R-20 Silver LLumar® Solar Control Window Film manufactured by CPFilms, Inc., Martinsville, Va.;
  first immiscible component 50 may include sodium chloride dissolved in water in an approximately 6.6% solution, and food coloring such a Schilling® Assorted Food Colors & Egg Dye manufactured by McCormick & Co., Inc., Hunt Valley, Md.; and
  second immiscible component 54 may include benzyl alcohol and a dye such as that used in the wick of a HI-LITER® fluorescent highlighter manufactured by Avery Dennison, Pasadena, Calif.

Additionally, first and second immiscible components 50,54 may include colored polyester glitter fragments in suspension in silicone oil.

Figure 2:
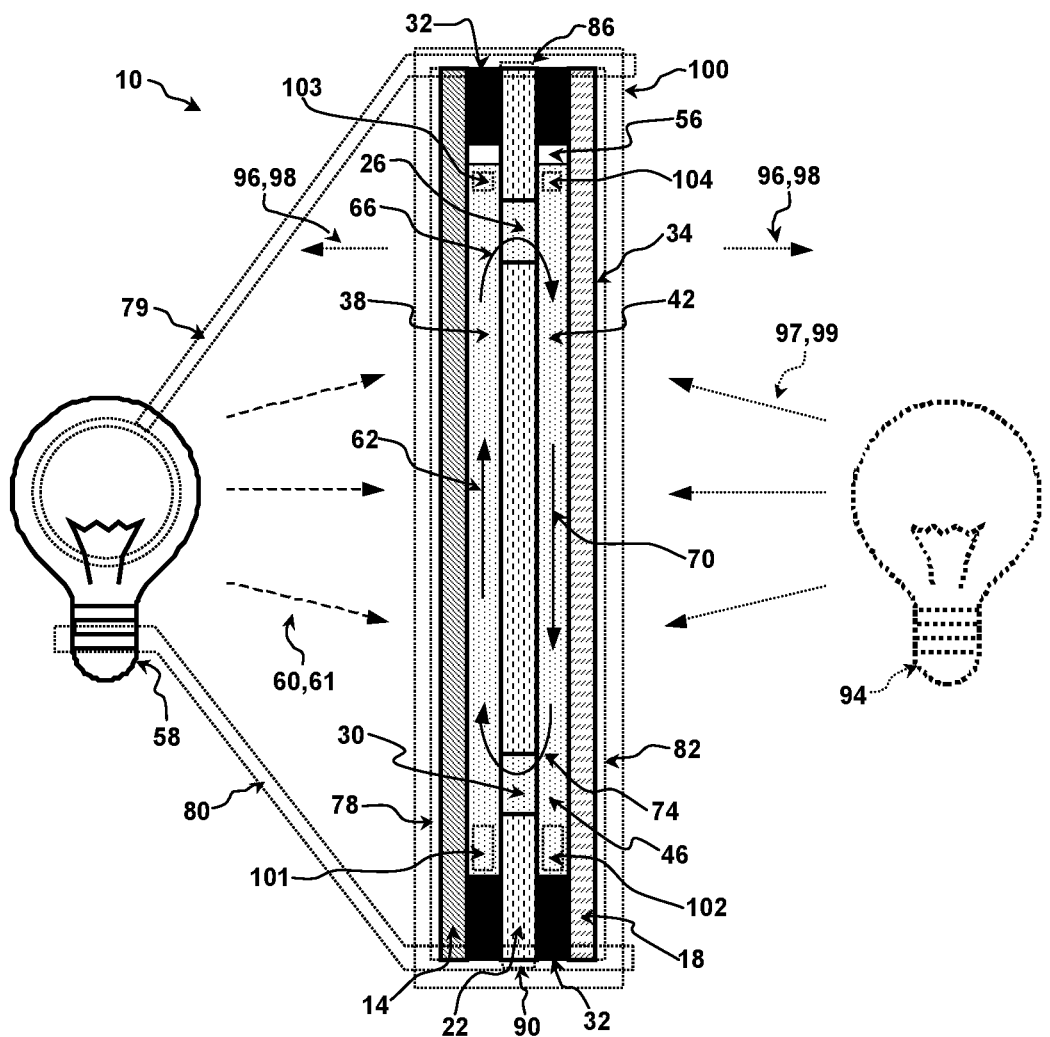
FIG. 2 depicts a side perspective of a laminar liquid motion display.

Referring now to FIG. 2, a depiction is given of a side cross-section perspective of a laminar liquid motion display 10. The same components as in FIG. 1 have the same assigned numbers as in FIG. 1. Display 10 includes a first outer film 14, a second outer film 18 and a flow separator film 22. At least a portion of flow separator film 22 includes one or more upper flow holes 26 and one or more lower flow holes 30. Flow separator film 22 is sandwiched between outer films 14,18. A border seal 32 binds at least a portion of films 14,18,22 together along their periphery thereby forming a generally thin chamber 34. Seal 32 may include and be formed by thermal seals, hermetic and near-hermetic seals, adhesives, pressure seals, welds, lamination or other techniques and materials used for sealing films. In this fashion, chamber 34 includes a first generally thin compartment 38 and a second generally thin compartment 42. A heat transfer fluid 46 is disposed within chamber 34 and may circulate within chamber 34 through compartments 38,42 and flow holes 26,30. One or more air gaps 56 may be provided in chamber 34 to allow for thermal expansion of fluid 46. Air gaps 56 may include air or inert or other gases. A lamp 58 may be disposed in the proximity of chamber 34 and provides light (generally indicated by arrows 60) to illuminate at least a portion of fluid 46 and heat (generally indicated by arrows 61) to power motion in at least a portion of fluid 46. In this fashion, first compartment 38 may be disposed proximally to lamp 58 and second compartment 42 may be disposed distally to lamp 58. Chamber 34 may be formed into shapes including flat planes, open or closed curved surfaces including cylinders, cones and spheres. At least a portion of the flow of fluid 46 is generally indicated by arrows 62,66,70,74.

Optional support structures 78,79,80,82,86 may be disposed within, in contact with or in the proximity of at least a portion of films 14,18,22 for providing structural support or reinforcement to chamber 34. In this fashion, support structures 78,79,80,82,86 may provide additional structural support to at least a portion of films 14,18,22 and chamber 34 for maintaining their shape when filled with fluid 46. Further, support structures 78,79,80,82,86 may serve to structurally connect chamber 34 to lamp 58 or to a base (not shown) that is structurally connected to lamp 58. Support structures 78,79,80,82,86 may be at least partially translucent, transparent or opaque to light 60 and heat 61 and may incorporate generally structurally solid materials including as acrylic polymer, glass, plastic and metal. Further, support structures 78,79,80,82,86 may additionally serve to provide heat collection, storage or dissipation to improve the convection process. Structures 78,79,80,82,86 may be fixed to films 14,18,22 or chamber 34 by heat, adhesive, cement, pressure, welding, rivets, screws, lamination or other techniques used for fixing together pieces or layers of plastic, glass, metal or other structural material.

Additional lamps 90,94 may be disposed within, in contact with or in the proximity of display 10. Additional lamps 90,94 may provide additional light 96,97 or heat 98,99 serving to illuminate or enable convection in display 10.

Alternatively, it may be desirable that display 10 be constructed and operated without the inclusion of flow separator film 22. In this fashion, chamber 34 may include a single compartment 100 and at least a portion of fluid 46 may put into motion by convection.

Display 10 may be disposed within, in contact with or in the proximity of window material including glass or plastic. In this fashion, at least a portion of display 10 may be or may be used in conjunction with a window or window pane. Likewise in this fashion, at least a portion of light 60,96,97 and heat 61,98,99 may include radiation from sources including the sun, indoor heating systems and living organisms.

Chamber 34 may include a number of surface tension breaking objects 101,102,103,104. Surface tension breaking objects 101,102,103,104 may assist in breaking the surface tension of at least a portion of fluid 46.

Figure 3:
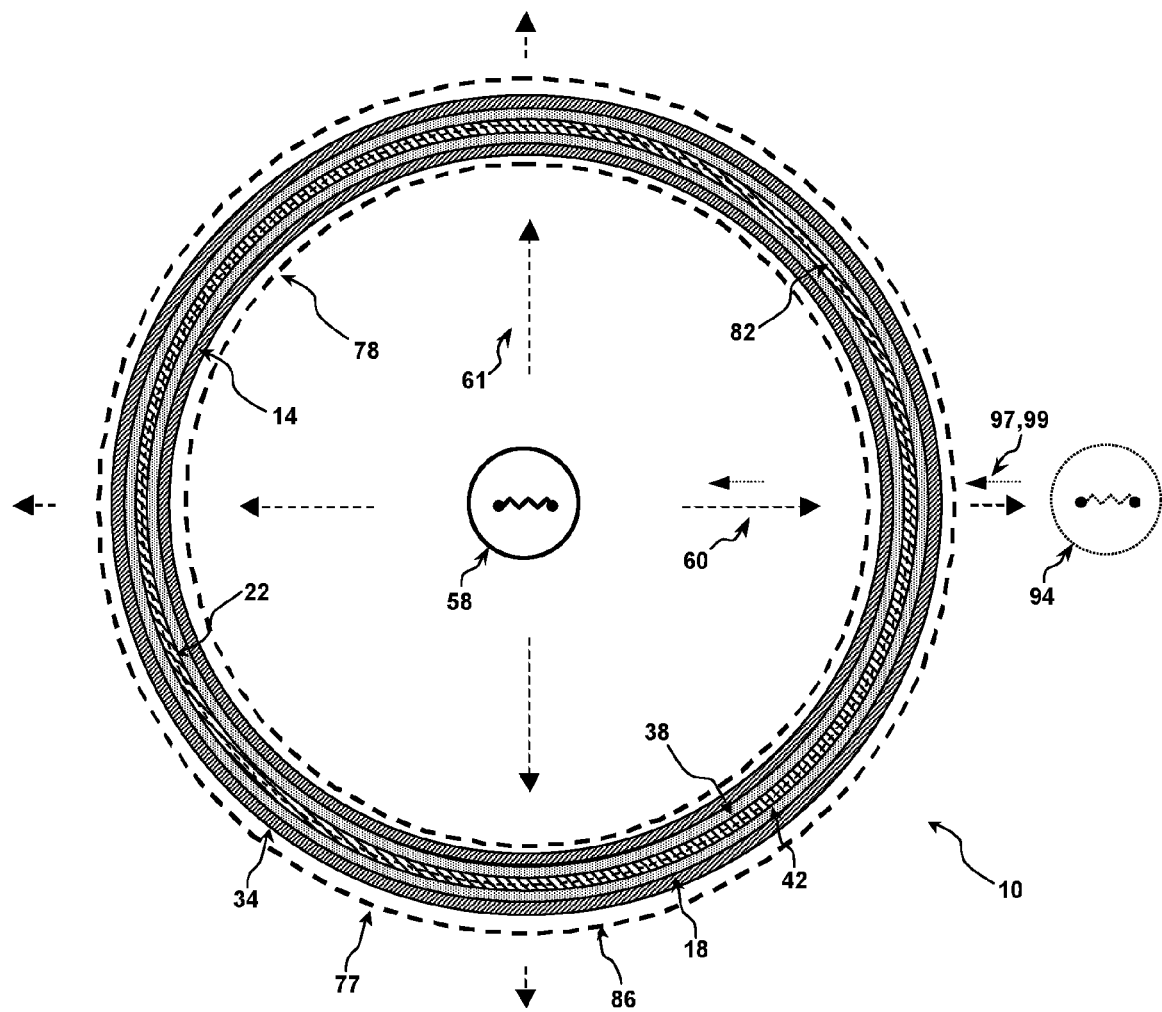
FIG. 3 depicts a top perspective of a laminar liquid motion display that includes a cylindrical chamber.

Referring now to FIG. 3, a depiction is given of a top perspective of a laminar liquid motion display 10. The same components as in FIG. 2 have the same assigned numbers as in FIG. 2. The display 10 includes a first outer film 14, a second outer film 18 and a flow separator film 22. Flow separator film 22 includes one or more upper flow holes (not shown) and one or more lower flow holes (not shown). Flow separator film 22 is sandwiched between outer films 14,18. A border seal (not shown) binds at least a portion of films 14,18,22 together along their periphery thereby forming a generally thin chamber 34. Seal 32 may include thermal seals, adhesives, pressure seals, welds, lamination or other techniques used for sealing films. In this fashion, chamber 34 includes a first generally thin compartment 38 and a second generally thin compartment 42. A heat transfer fluid (not shown) is disposed within chamber 34 and may circulate within chamber 34 through compartments 38,42 and flow holes (not shown). One or more air gaps (not shown) may be provided in chamber 34 to allow for thermal expansion of fluid (not shown). A lamp 58 may be disposed in the proximity of chamber 34 providing light (generally indicated by arrows 60) to illuminate at least a portion of fluid 46 and heat (generally indicated by arrows 61) to power motion in at least a portion of fluid 46. In this fashion, first compartment 38 may be disposed proximally to lamp 58 and second compartment 42 may be disposed distally to lamp 58. Chamber 34 may be formed into the shape of a cylinder (generally indicated by 77) and disposed concentrically around lamp 58. Alternatively, chamber 34 may be formed into shapes including flat planes, open or closed curved surfaces including cones and spheres. Optional support structures 78,82,86 (79,80 not shown) may be disposed within, in contact with or in the proximity of films 14,18,22 for providing structural support or reinforcement to chamber 34. In this fashion, support structures 78,82,86 (79,80 not shown) may provide additional structural support to at least a portion of films 14,18,22 and chamber 34 for maintaining their shape. Further, support structures 78,82,86 (79,80 not shown) may additionally provide heat collection, storage or dissipation. Additional lamps 94 (FIG. 2) may be disposed within, in contact with or in the proximity of display 10. Additional lamps 94 may provide additional light 97 or heat 99 serving to illuminate or enable convection in display 10.

Figure 4:
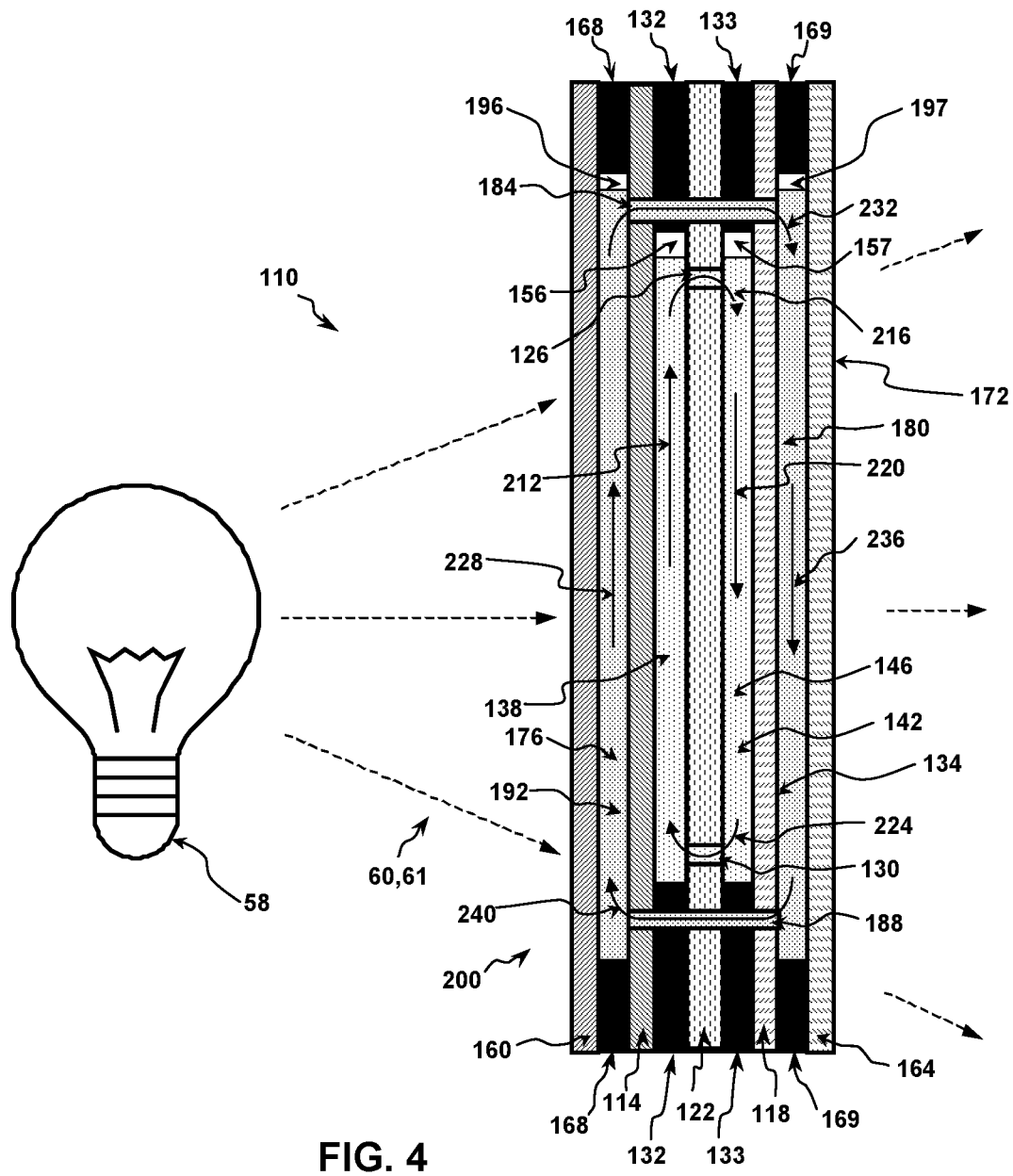
FIG. 4 depicts a side perspective of a laminar liquid motion display that includes a double-nested chamber.

Referring now to FIG. 4, a depiction is given of a side cross-section perspective of a laminar liquid motion display that includes two nested chambers (a double-nested chamber) 110. The display 110 includes a first outer film 114, a second outer film 118 and a flow separator film 122. Flow separator film 122 includes one or more first upper flow holes 126 and one or more first lower flow holes 130. Flow separator film 122 is sandwiched between outer films 114, 118. One or more first border seals 132,133 serve to bind films 114,118,122 together along their periphery thereby forming a first generally thin chamber 134. In this fashion, first chamber 134 includes a first generally thin first compartment 138 and a second generally thin compartment 142. A first heat transfer fluid 146 is disposed within first chamber 134 and may circulate within first chamber 134 through compartments 138,142 and first flow holes 126,130. One or more first air gaps 156,157 may be provided in first chamber 134 to allow for thermal expansion of first fluid 146.

A third outer film 160 is disposed in the proximity of first outer film 114. Likewise, a fourth outer film 164 is disposed in the proximity of second outer film 118. One or more second border seals 168,169 serve to bind third outer film 160 to first outer film 114 and, likewise, bind fourth outer film 164 to second outer film 118. Second border seals 168,169 run along the periphery of films 160,114,164,118 thereby forming a second generally thin chamber 172 that is generally nested around and external to first chamber 134. In this fashion, second chamber 172 includes a third generally thin compartment 176 and a fourth generally thin compartment 180.

One or more second upper flow holes 184 and one or more second lower flow holes 188 are disposed and run through at least a portion of films 114,118,122 and first seals 132, 133. Second flow holes 184,188 are preferably disposed outside of first and second compartments 138,142 such that first chamber 134 and second chamber 172 are isolated from each other such that fluid 146 may not pass between first chamber 134 and second chamber 172. In this fashion, second flow holes 184,188 serve to inter-connect compartments 176,180. Further, first chamber 134 serves as a flow separator and insulator to second chamber 172 in the same fashion that flow separator film 122 serves as a flow separator and insulator to first chamber 134.

A second heat transfer fluid 192 is disposed within second chamber 172 and may circulate within second chamber 172 through compartments 176,180 and second flow holes 184, 188. Fluids 146,192 may include any number of generally immiscible components (not shown). Fluids 146,192 and their immiscible components may be in the form of suspensions, solutions, colloidal solutions, emulsions and mixtures. The components of fluids 146,192 may include liquids, solids, gases or plasmas including mineral oil, benzyl alcohol, sodium chloride, potassium chloride, salts, liquid paraffin, paraffin wax, paraffin oil, napthene, water, isopropyl alcohol, silicon oil, melamine formaldehyde, plastic microspheres, mineral Spirits, xylene, toluene, carbon tetrachloride, dyes, ethanol, surfactants, solvents, emulsifiers, glycerol, ethylene glycol, and polyethylene glycol (aka PEG). Fluids 146,192 may include identical or different components; one example being the types or colors of dye used in their respective components may vary.

One or more second air gaps 196,197 may be disposed in second chamber 172 to allow for thermal expansion of second fluid 192.

In this fashion, first chamber 134 and second chamber 172 together form a double-nested chamber (generally indicated at 200) wherein one closed chamber (172) encases another closed chamber (134).

Alternatively, it may be desirable for at least a portion of chambers 134,172 to be in communication each other. In this fashion, at least a portion of flow holes 184,188 may penetrate at least a portion of compartments 134,172 thereby allowing at least a portion of fluids 146,192 to flow between chambers 134,172.

A lamp 58 is disposed in the proximity of double-nested chamber 200 and provides light (generally indicated by arrows 60) to illuminate at least a portion of fluids 146,192 and heat (generally indicated by arrows 61) to power motion in at least a portion of fluids 146,192 by natural convection. In this fashion, first and third compartments 138,176 may be disposed proximally to lamp 58 thereby functioning similarly to a heat collector in a thermosiphon. Likewise, second and fourth compartments 142,180 may be disposed distally to lamp 58 thereby functioning similarly to a condenser or cooling tank in a thermosiphon. At least a portion of the flow of first fluid 146 is generally indicated by arrows 212,216, 220,224; at least a portion of the flow of second fluid 192 is generally indicated by arrows 228,232,236,240. The immiscible components of fluids 146,192 may be dyed with different colors for enhancing the visual effects as they circulate inside double-nested chamber 200. Double-nested chamber 200 may be adjoined to lamp 58 by a support structure (not shown). Additionally, one or more optional support structures (not shown) may be disposed within, in contact with or in the proximity of double-nested chamber 200 for providing structural support or reinforcement to at least a portion of films 114,118,122,160,164.

Films 114,118,122,160,164 may include thermoplastics, polycarbonate, resins, thermosets, and elastomers, including low- and high-density polyethylene, polypropylene, PIFE, polystyrene, PMMA, nylon, polyester, Mylar®, vinyl, polyvinyl chloride (PVC), acrylic polymer, epoxy, phenolformaldehyde, glass, plastic, transparent polyarylsulfone, polyamide and thermoplastic polyester and polymethylpentene, fluorinated ethylene, propylene polymers, combinations of these materials with each other and with other transparent or transluscent materials, as for example metals, or any other plastics or combinations or laminates of plastics or packaging materials that are suitable for forming a hermetic or near-hermetic seal around fluids 146,192. Films 114,118, 122,160,164 may be chosen for their physical properties including thickness, free shrinkage, UV stability, tensile strength, elongation, tear strength, specific gravity, hardness, color, opacity, chemical resistance, thermal stability, water absorption, surface energy, melting point and coefficient of thermal expansion. Additionally, at least a portion of films 114,118,122,160,164 may include colored, fluorescent or phosphorescent materials.

Flow holes 126,130,184,188 may be disposed in a number of shapes, sizes and arrangements including slots, openings, round holes, perforations, cut-outs, and any other geometries that the permits the flow of fluids 146,192 inside doublenested chamber 200. Optionally, flow holes 126,130,184, 188 may include flow control structures (not shown) including valves, flaps and unidirectional valves and nozzles for further directing and controlling the flow of fluids 146,192 inside double-nested chamber 200.

Double-nested chamber 200 may be curved concentrically around lamp 58 and may form a generally closed surface. In this fashion, double-nested chamber 200 may additionally provide the functionality similar to that of a common lampshade and filter a portion of the light (not shown) that is emitted from lamp 58. Additionally, other closed or open surface shapes may be desirable, including spheres, hemispheres, cylinders, cones, frusto-cones, helixes, mobius strips and other symmetric and asymmetric shapes. Lamp 58 may be disposed in the proximity of the axis (not shown) or off-axis with respect to double-nested chamber 200 for providing generally uniform or non-uniform heating and illumination to fluids 146,192 as might be desirable. For some chamber topologies, morphologies or shapes, such as a frusto-cone, fluids 146,192 may encounter pressure gradients or other forces (not shown) resulting in vortices, turbulence and other random, laminar or non-laminar flow patterns (not shown).

Figure 5:
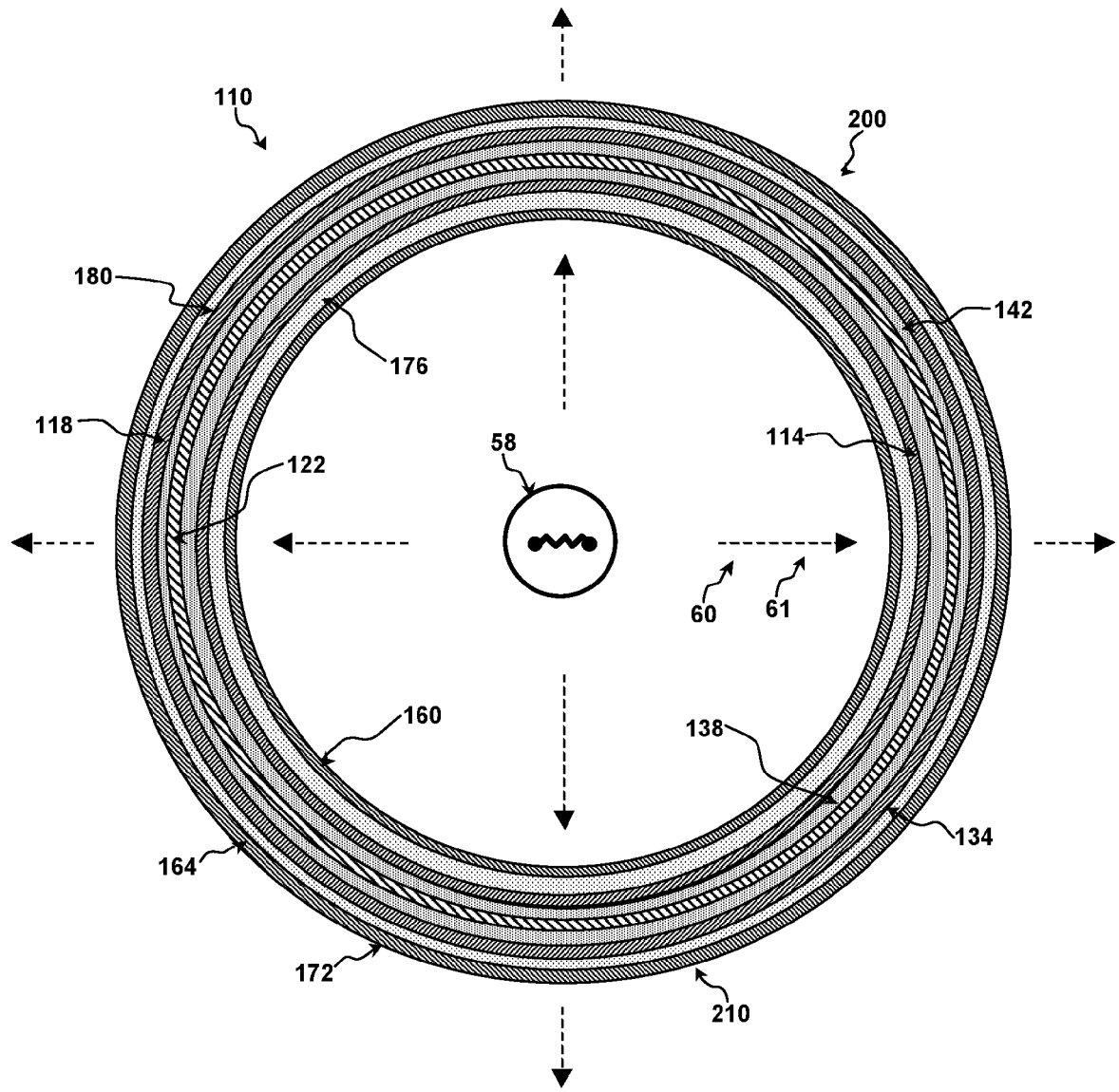
FIG. 5 depicts a top perspective of laminar liquid motion display that includes a cylindrical double-nested chamber.

Referring now to FIG. 5, a depiction is given of a top perspective of a laminar liquid motion display that include a double-nested chamber 110. The same components as in FIG. 4 have the same assigned numbers as in FIG. 4. Display 110 includes a first outer film 114, a second outer film 118 and a flow separator film 122. Flow separator film 122 is sandwiched between outer films 114,118. One or more first border seals (not shown) serve to bind films 114,118,122 together along their periphery thereby forming a first generally thin chamber 134. In this fashion, first chamber 134 includes a first generally thin first compartment 138 and a second generally thin compartment 142. A first heat transfer fluid (not shown) is disposed within first chamber 134 and may circulate within first chamber 134. One or more first air gaps (not shown) may be provided in first chamber 134. A third outer film 160 is disposed in the proximity of first outer film 114. Likewise, a fourth outer film 164 is disposed in the proximity of second outer film 118. One or more second border seals (not shown) serve to bind third outer film 160 to first outer film 114 and, likewise, bind fourth outer film 164 to second outer film 118. Second border (not shown) runs along the periphery of films 160,114,164,118 thereby forming a second generally thin chamber 172 that is generally nested around and external to first chamber 134. In this fashion, second chamber 172 includes a third generally thin compartment 176 and a fourth generally thin compartment 180. A second heat transfer fluid (not shown) is disposed within second chamber 172 and may circulate within second chamber 172 through flow holes (not shown). One or more second air gaps (not shown) may be disposed in second chamber 172. In this fashion, first chamber 134 and second chamber 172 together form a double-nested chamber (generally indicated at 200) wherein one closed chamber encases another closed chamber. A lamp 58 is disposed in the proximity of double-nested chamber 200 and provides light (generally indicated by arrows 60) and heat (generally indicated by arrows 61). In this fashion, first and third compartments 138,176 may be disposed proximally to lamp 58 and second and fourth compartments 142,180 may be disposed distally to lamp 58. Optional support structures (not shown) may be disposed within, in contact with or in the proximity of double-nested chamber 200 for providing structural support, reinforcement, heat collection, storage or dissipation. Double-nested chamber 200 may be curved concentrically around lamp 58 and may form a generally closed cylindrical surface 210.

Figure 6:
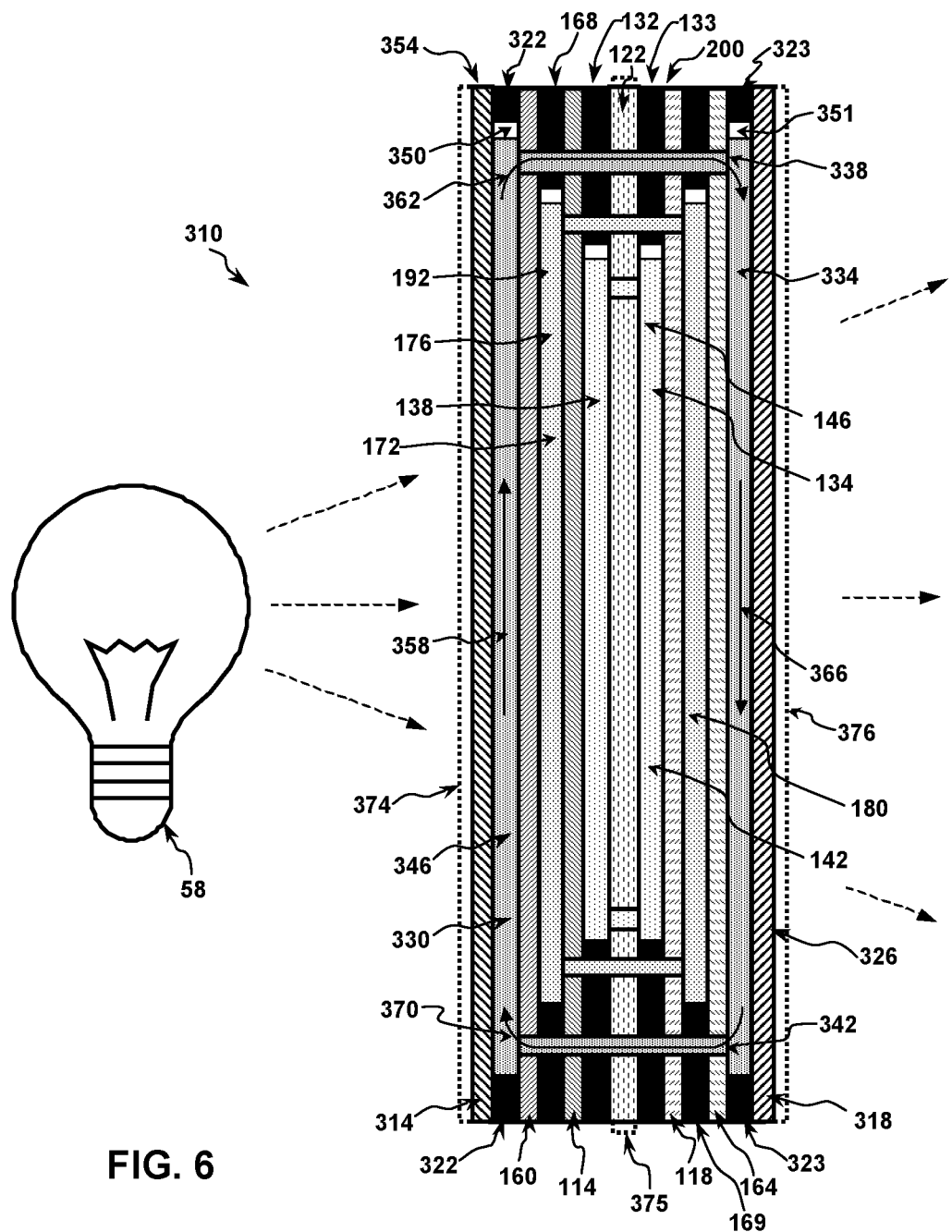
FIG. 6 depicts a side perspective of a laminar liquid motion display that includes a triple-nested chamber.

Referring now to FIG. 6, a depiction is given of a side cross-section perspective of a laminar liquid motion display that includes three nested chambers (a triple-nested chamber) 310. The same components as in FIG. 4 have the same assigned numbers as in FIG. 4. Display 310 includes a double-nested chamber (generally indicated at 200). Double-nested chamber 200 includes a first outer film 114, a second outer film 118, a flow separator film 122, a third outer film 160, a fourth outer film 164, a first chamber 134, a second chamber 172, a first fluid 146, a second fluid 192, a first compartment 138, a second compartment 142, a third compartment 176, a fourth compartment 180, and first and second border seals 132,133,168,169.

A fifth outer film 314 is disposed in the proximity of third outer film 160. Likewise, a sixth outer film 318 is disposed in the proximity of fourth outer film 164. One or more third border seals 322,323 serve to bind fifth outer film 314 to third outer film 160 and, likewise, bind sixth outer film 318 to fourth outer film 164. Third border seals 322,323 run along the periphery of films 314,160,318,164 thereby forming a third generally thin chamber 326 that is generally nested around and external to double-nested chamber 200. In this fashion, third chamber 326 includes a fifth generally thin compartment 330 and a sixth generally thin compartment 334.

One or more third upper flow holes 338 and one or more third lower flow holes 342 are disposed and run through films 114,118,122,160,164 and first and second seals 132,133,168,169. Third flow holes 338,342 are preferably disposed outside of first, second, third and fourth compartments 138,142,176,180 such that third chamber 326 and double-nested chamber 200 are isolated from each other such that first and second fluids 146,192 may not pass between third chamber 326 and double-nested chamber 200. In this fashion, third flow holes 338,342 serve to inter-connect fifth and sixth compartments 330,334. Further, double-nested chamber 200 serves as a flow separator and insulator to third chamber 326 in the same fashion that flow separator film 122 serves as a flow separator and insulator to first chamber 134.

A third heat transfer fluid 346 is disposed within third chamber 326 and may circulate within third chamber 326 through fifth and sixth compartments 330,334 and third flow holes 338,342. Third fluid 346 may include any number of generally immiscible components (not shown). Third fluid 346 and its immiscible components may be in the form of suspensions, solutions, colloidal solutions, emulsions and mixtures. The components of third fluid 346 may include liquids, solids, gases or plasmas including mineral oil, benzyl alcohol, sodium chloride, potassium chloride, salts, liquid paraffin, paraffin wax, paraffin oil, napthene, water, isopropyl alcohol, silicon oil, melamine formaldehyde, plastic microspheres, mineral Spirits, xylene, toluene, carbon tetrachloride, dyes, ethanol, surfactants, solvents, emulsifiers, glycerol, ethylene glycol, and polyethylene glycol (aka PEG). Third fluid 346 may include identical or different components to first and second fluids 146,192; one example being the types or colors of dye used in their components. One or more third air gaps 350,351 may be disposed in third chamber 326 to allow for thermal expansion of third fluid 346. In this fashion, third chamber 326 and double-nested chamber 200 together form a triple-nested chamber (generally indicated at 354) wherein one closed chamber encases another closed chamber.

Alternatively, it may be desirable for at least a portion of chambers 200,326 to be in communication each other. In this fashion, at least a portion of flow holes 338,342 may penetrate at least a portion of double-nested chamber 200 thereby allowing at least a portion of fluids 146,192,346 to flow between chambers 200,326.

A lamp 58 may be disposed in the proximity of triple-nested chamber 354 thereby providing light for illumination and heat to power motion in at least a portion of first, second and third fluids 146,192,346 by natural convection. In this fashion, first, third and fifth compartments 138,176,330 may be disposed proximally to lamp 58 thereby functioning similarly to a heat collector in a thermosiphon. Likewise, second, fourth and sixth compartments 142,180,334 may be disposed distally to lamp 58 thereby functioning similarly to a condenser or cooling tank in a thermosiphon. At least a portion of the flow of third fluid 346 is generally indicated by arrows 358,362,366,370. The immiscible components of third fluid 346 may be dyed with different colors for enhancing the visual effects as they circulate inside triple-nested chamber 354. Triple-nested chamber 354 may be adjoined to lamp 58 by a support structure (not shown). One or more optional support structures 374,375,376 may be disposed within, in contact with or in the proximity of Triple-nested chamber 354 for providing structural support, reinforcement, heat collection, storage or dissipation.

Films 314,318 may include thermoplastics, polycarbonate, resins, thermosets, and elastomers, including low- and high-density polyethylene, polypropylene, PIFE, polystyrene, PMMA, nylon, polyester, Mylar®, vinyl, polyvinyl chloride (PVC), acrylic polymer, epoxy, phenolformaldehyde, glass, plastic, transparent polyarylsulfone, polyamide and thermoplastic polyester and polymethylpentene, fluorinated ethylene, propylene polymers, combinations of these materials with each other and with other transparent or transluscent materials, as for example metals, or any other plastics or combinations or laminates of plastics or packaging materials that are suitable for forming a hermetic or near-hermetic seal around third fluid 346. Films 314,318 may be chosen for their physical properties including thickness, free shrinkage, UV stability, tensile strength, elongation, tear strength, specific gravity, hardness, color, opacity, chemical resistance, thermal stability, water absorption, surface energy, melting point and coefficient of thermal expansion. Additionally, at least a portion of films 314,318 may include colored, fluorescent or phosphorescent materials.

Third flow holes 338,342 may be disposed in a number of shapes, sizes and arrangements including slots, openings, round holes, perforations, cut-outs, and any other geometries that the permits the flow of third fluid 346 inside triple-nested chamber 354. Optionally, third flow holes 338,342 may include flow control structures (not shown) including valves, flaps and unidirectional valves and nozzles for further directing and controlling the flow of third fluid 346 inside triple-nested chamber 354.

Triple-nested chamber 354 may be curved concentrically around lamp 58 and may form a generally closed surface. In this fashion, triple-nested chamber 354 may additionally provide the functionality similar to that of a lampshade and filter a portion of the light (not shown) that is emitted from lamp 58. Additionally, other closed or open surface shapes may be desirable, including spheres, hemispheres, cylinders, cones, frusto-cones, helixes, mobius strips and other symmetric and asymmetric shapes. Lamp 58 may be disposed in the proximity of the axis (not shown) or off-axis with respect to triple-nested chamber 354 for providing generally uniform or non-uniform heating and illumination to fluids 146,192,346 as might be desirable. For some chamber topologies, morphologies or shapes, such as a frusto-cone, fluids 146,192,346 may encounter pressure gradients or other forces (not shown) resulting in vortices, turbulence and other random, laminar or non-laminar flow patterns (not shown).

Figure 7:
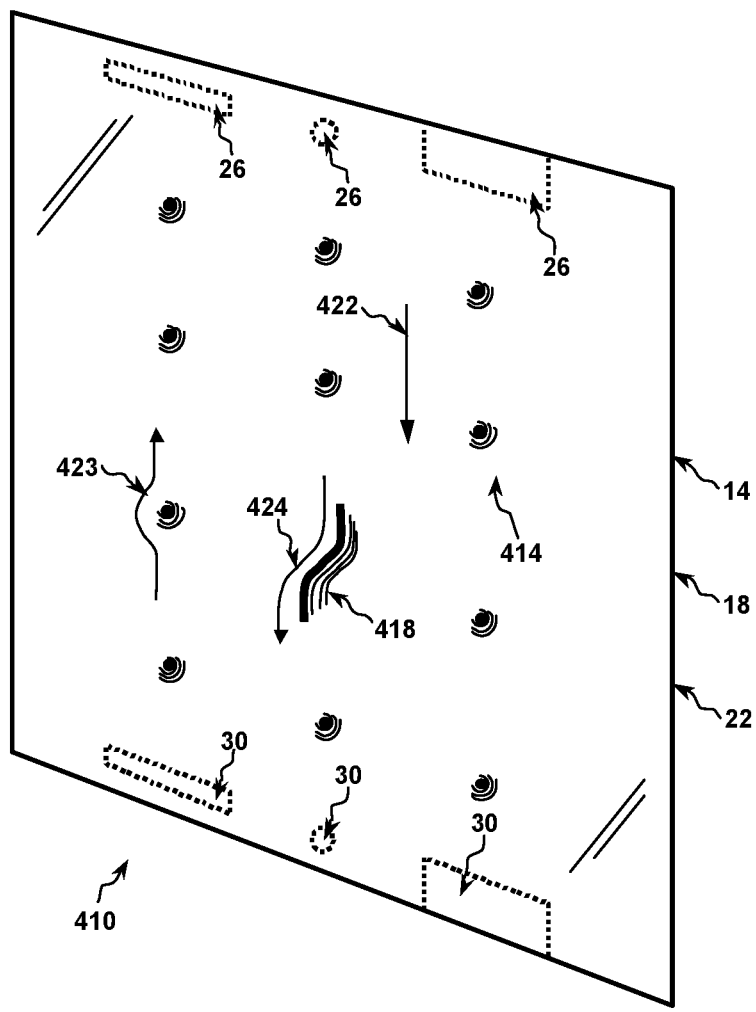
FIG. 7 depicts a modified film that includes a surface relief pattern for use in a laminar liquid motion display.

Referring now to FIG. 7, a depiction is given of a modified film 410 for use in a laminar liquid motion display (not shown). The same components as in FIG. 1 have the same assigned numbers as in FIG. 1. Film 410 may be similar in its physical, optical and other properties to at least a portion of outer films 14,18 and flow separator film 22. Film 410 includes one or more surface relief patterns (generally indicated at 414). Surface relief patterns 414 may be disposed on at least a portion of either side of film 410. Surface relief patterns 414 may include bumps, grooves, curves 418 or other shapes and serve as spacers between film 410 and any other films or surfaces that may be the proximity of or contact with film 410. Additionally, surface relief patterns 414 may be serve to control at least a portion of the flow (generally indicated by arrows 422,423,424) of fluids (not shown). Surface relief patterns 414 may be disposed in at least a portion of films 14,18,22 by the use of a roller, press, printer, lamination or adhesion of other films or materials, thermal deformation or any other method for providing a surface relief pattern to a generally flat film. The dimensions of surface relief patterns 414 may be on the scale of the thickness of films 14,18,22 (for example, approximately 0.1 to 0.5 mm). However it may also be desirable for surface relief patterns 414 to be disposed at dimensional scales much larger or smaller than the thickness of films 14,18,22. Film 410 may include one or more upper flow holes 26 and one or more lower flow holes 30.

Figure 8:
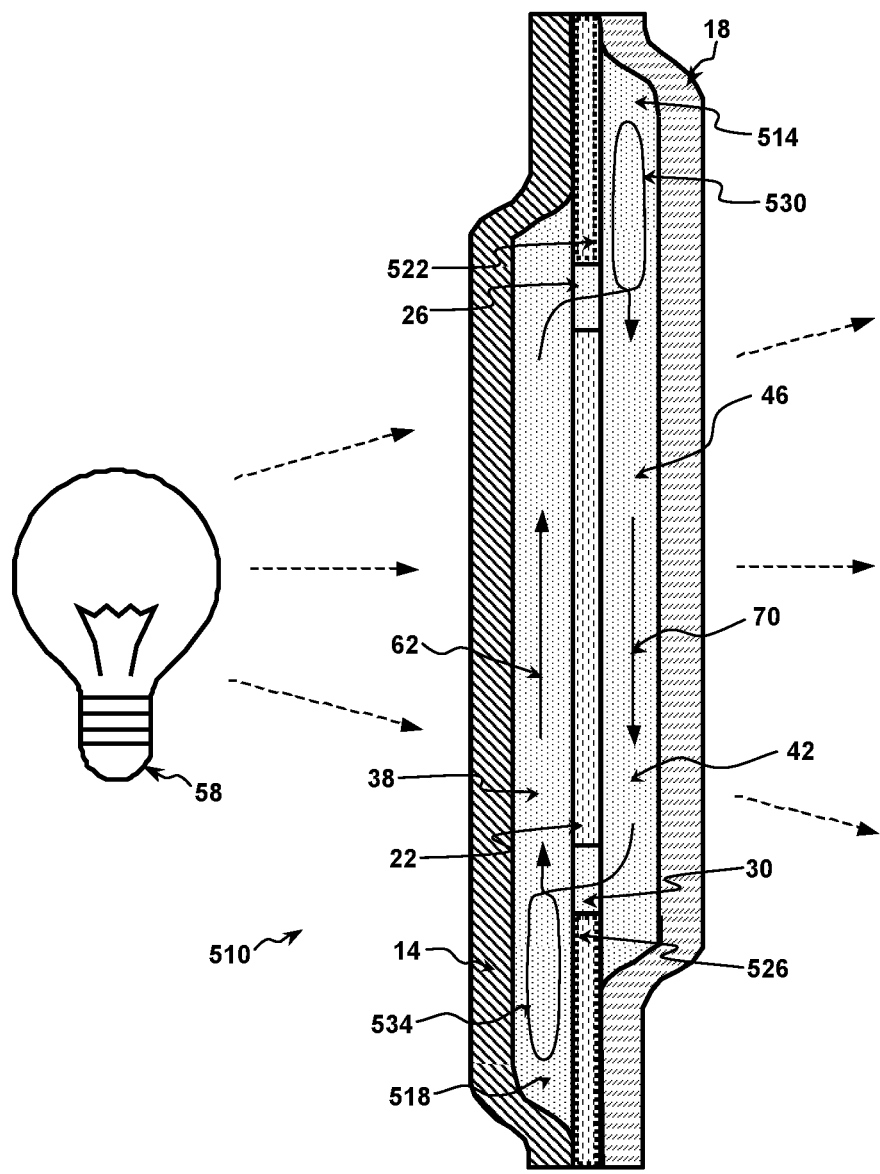
FIG. 8 depicts a laminar liquid motion display that includes heating and cooling reservoirs.

Referring now to FIG. 8, a depiction is given of a laminar liquid motion display 510 that includes a number of heating and cooling reservoirs for improving or modifying convection in display 510. The same components as in FIG. 1 have the same assigned numbers as in FIG. 1. Display 510 includes a first outer film 14, a second outer film 18, a flow separator film 22, a first compartment 38, a second compartment 42, one or more upper flow holes 26, one or more lower flow holes 30 and a heat transfer fluid 46. A lamp 58 may be disposed in the proximity of display 510. First compartment 38 is disposed proximally to lamp 58. A first reservoir 514 may be disposed in the upper portion of second compartment 42 in the space between flow separator film 22 and second outer film 14. A second reservoir 518 may be disposed in the lower portion of first compartment 38 in the space between first outer film 14 and flow separator film 22. A first thermal reflector film 522 may be disposed within, in contact with or in proximity to at least a portion of flow separator film 22 and first reservoir 514. Likewise, a second thermal reflector film 526 may be disposed within, in contact with or in proximity to at least a portion of flow separator film 22 and second reservoir 518. Thermal reflector films 522,526 may be generally reflective to heat and provide an increased thermal barrier over that provided by flow separator film 22 alone. Thermal reflector films 522,526 may be at least partially translucent, transparent, reflective or opaque to light. Possible materials for thermal reflector films 522,526 include metallized polyester film.

For example, the convection cycle for display 510 may include the following: at least a portion of fluid 46 is heated and flows upward in first compartment 38 (generally indicated by arrow 62). At least a portion of fluid 46 flows through upper flow holes 26 and into first reservoir 514 (generally indicated by arrow 530). At least a portion of fluid 46 cools in first reservoir 514 and flows downward in second compartment 42 (generally indicated by arrow 70). At least a portion of fluid 46 flows through lower flow holes 30 and into second reservoir 518 (generally indicated by arrow 534). At least a portion of fluid 46 is heated or re-heated in second reservoir 518 and flows upward in first compartment 38 (again, indicated by arrow 62).

Figure 9:
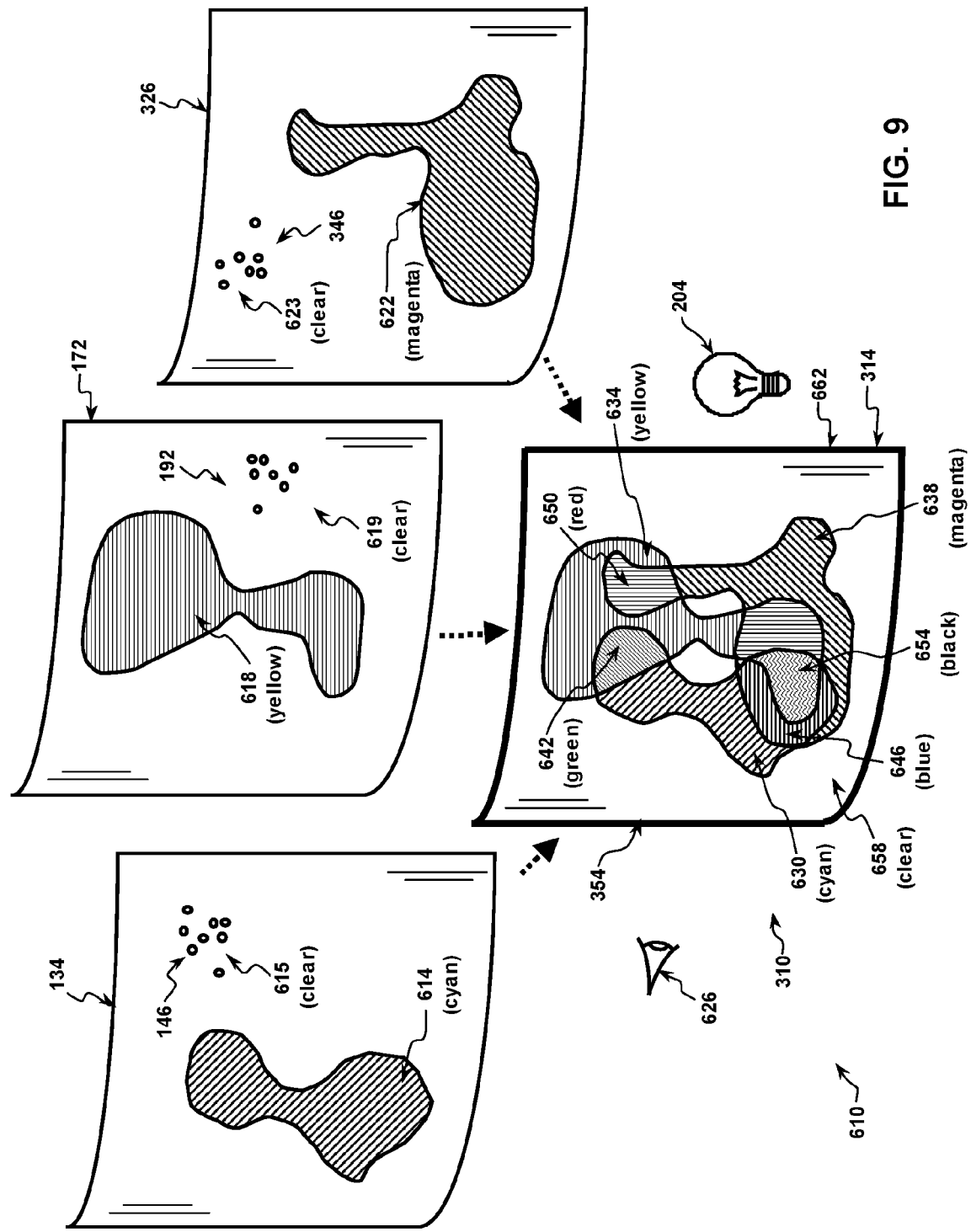
FIG. 9 depicts a method for color mixing in a laminar liquid motion display.

Referring now to FIG. 9, a depiction is given of a method for color mixing 610 in a laminar liquid motion display 310. The same components as in FIG. 6 have the same assigned numbers as in FIG. 6. Display 310 includes a first chamber 134 that contains a first heat transfer fluid 146, a second chamber 172 that contains a second heat transfer fluid 192 and a third chamber 326 that contains a third heat transfer fluid 346. First, second and third chambers 134,172,326 are disposed around each other to form a triple-nested chamber 354. First fluid 146 may include one or more first immiscible components 614,615. Similarly, second fluid 192 may include one or more second immiscible components 618,619. Likewise, third fluid 346 may include one or more third immiscible components 622,623.

A lamp 58 may be disposed in the proximity of display 310.

Subtractive color mixing is one possible method of color mixing 610 that may be achieved in display 310. An example of subtractive color mixing is as follows: first fluid 146 may include a cyan-colored first component 614 and a clear (or generally colorless) first component 615. Similarly, second fluid 192 may include a yellow-colored second component 618 and a clear (or generally colorless) second component 619. Likewise, third fluid 346 may include a magenta-colored third component 622 and a clear (or generally colorless) third component 623. Colored components 614,618,622 are at least partially transparent or translucent to light (not shown) thereby functioning as spectral filters at their respective colors. An observer 626 viewing display 310 may perceive that components 614,615,618,619,622,623 overlap each other in changing combinations as fluids 146,192,346 circulate in triple-nested chamber 354.

The overlap of cyan component 614 and clear components 619,623 may result in observer 626 perceiving a cyan portion 630 of display 310. The overlap of yellow component 618 and clear components 615,623 may result in observer 626 perceiving a yellow portion 634 of display 310. The overlap of magenta component 622 and clear components 615,619 may result in observer 626 perceiving a magenta portion 638 of display 310. The overlap of cyan component 614, yellow component 618 and clear component 623 may result in observer 626 perceiving a green portion 642 of display 310. The overlap of cyan component 614, clear component 619 and magenta component 622 may result in observer 626 perceiving a blue portion 646 of display 310. The overlap of clear component 615, yellow component 618 and magenta component 622 may result in observer 626 perceiving a red portion 650 of display 310. The overlap of cyan component 614, yellow component 618 and magenta component 622 may result in observer 626 perceiving a black (or gray) portion 654 of display 310. Finally, the overlap of clear components 615,619,623 may result in observer 626 perceiving a clear portion 658 of display 310.

Additionally, a translucent film 662 may be disposed within, in contact with or in the proximity of fifth outer film 314 for providing a generally white diffuse background lighting in order to uniformly radiate or illuminate at least a portion of fluids 146,192,346. With diffuse illumination provided by translucent film 662, observer 626 may perceive clear portion 658 to be generally white (or generally the color of the light emitted by lamp 58).

While the above example describes color mixing in a triple-nested chamber 354, similar mixing of two or more colors may be achieved using a single chamber, double-nested chamber, or any number of chambers in general. Further, while the above example describes a method for subtractive color mixing, an additive color mixing method could similarly be achieved by projection of light through at least a portion of display 310.

Figure 10:
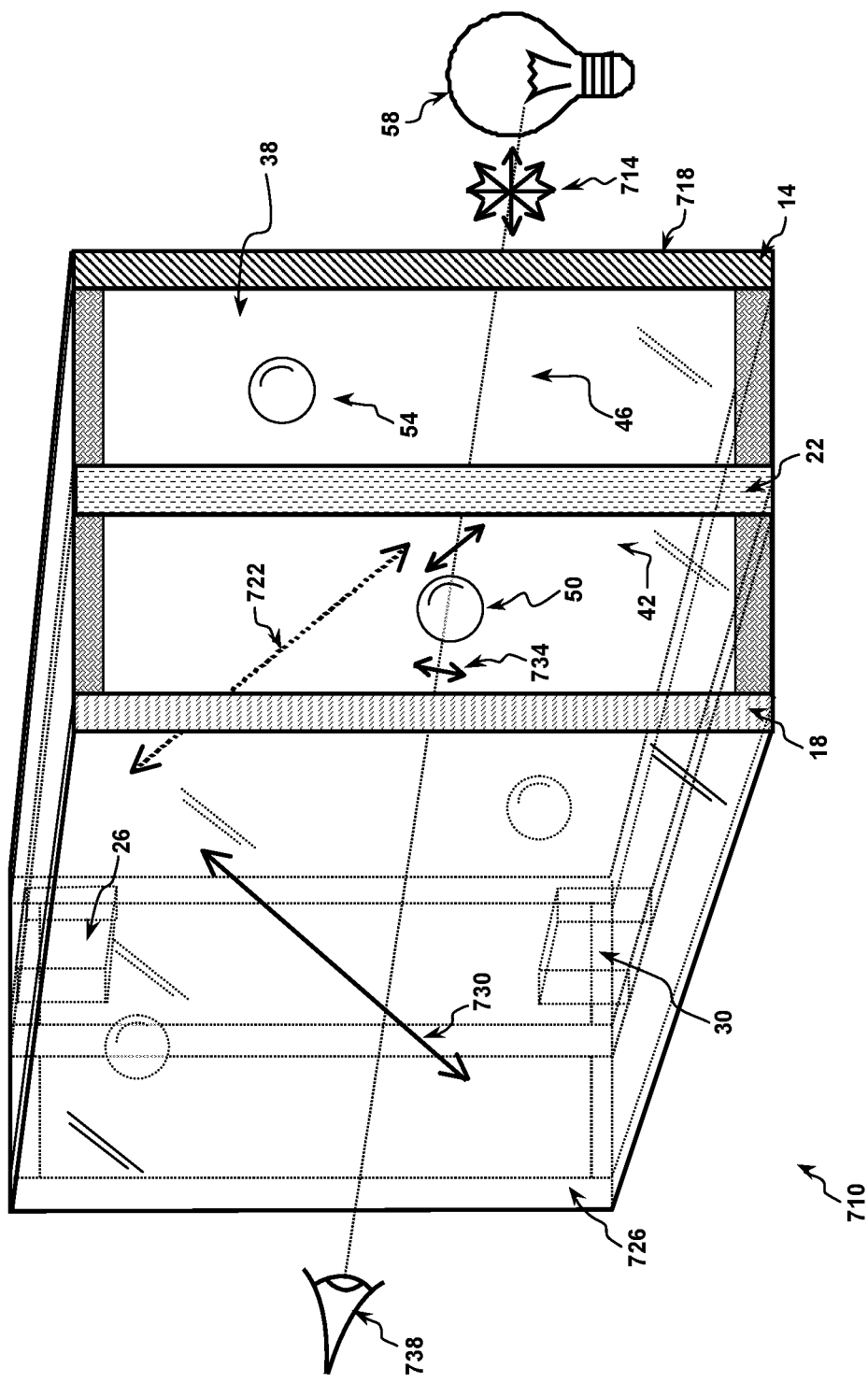
FIG. 10 depicts a laminar liquid motion display that utilizes polarization to display motion.

Referring now to FIG. 10, a depiction is given of a laminar liquid motion display 710 that utilizes polarization to display motion. The same components as in FIG. 1 have the same assigned numbers as in FIG. 1. Display 710 includes a first outer film 14, a second outer film 18, a flow separator film 22, one or more upper flow holes 26, one or more lower flow holes 30, a first compartment 38, a second compartment 42 and a heat transfer fluid 46. Fluid may include any number of generally immiscible components 50,54. A lamp 58 may be disposed in the proximity of display 710 and may emit generally non-polarized light 714.

A first polarizing film 718 may be disposed within, in contact with or in the proximity of at least a portion of first outer film 14. First polarizing film 718 includes a first polarization axis generally indicated by arrow 722. Likewise, a second polarizing film 726 may be disposed within, in contact with or in the proximity of at least a portion of second outer film 18. Second polarizing film 726 includes a second polarization axis generally indicated by arrow 730. Polarizing films 718,726 may be disposed in a cross-polarization mode wherein the polarization axes of each are oriented at 90 degrees relative to the other. In this fashion, first polarizing film 718 may serve to polarize at least a portion of the non-polarized light emitted from lamp 58. The polarization state of the light transmitted by first polarizing film 718 may include linear and circular polarizations. Similarly, second polarizing film 726 may function as an analyzer thereby rejecting generally at least a portion of the polarized light transmitted by first polarizing film 718. Alternatively, lamp 58 may emit polarized light, thereby eliminating the need for first polarizing film 718; in this case the second polarizing film 726 would still be required to serve as an analyzer.

At least a portion of immiscible components 50,54 may alter the polarization state of at least a portion of the light transmitted by first polarizing film 718 (generally indicated by arrow 734). Possible materials for polarization-altering components 50,54 include birefringent crystal or plastic microspheres. Changes in polarization may include optical rotation, wave retardation and random depolarization. In this fashion, changes in the polarization state of light transmitted by first polarizing film 718 resulting from interaction with components 50,54 may be analyzed and viewed by an observer 738 through second polarizing film 726.

Alternatively, either of first or second polarizing films 718,722 may be disposed within, in contact with or in the proximity of flow separator film 22.

Figure 11:
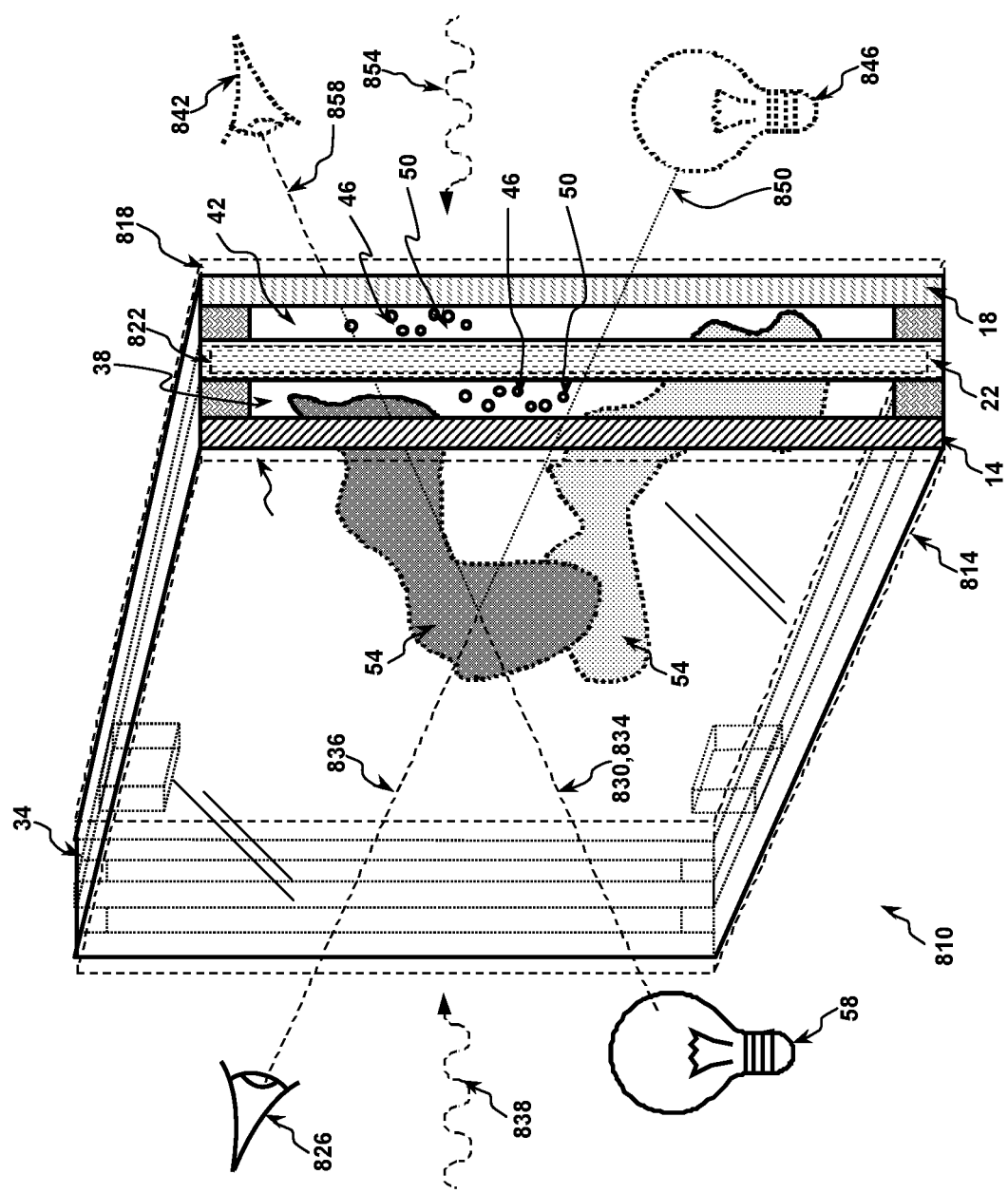
FIG. 11 depicts a laminar liquid motion display capable of operating in reflection mode.

Referring now to FIG. 11, a depiction is given of a laminar liquid motion display 810 capable of operating in reflection mode. The same components as in FIG. 1 have the same assigned numbers as in FIG. 1. Display 810 includes a chamber 34 that includes a first outer film 14, a second outer film 18, a flow separator film 22, a first compartment 38, a second compartment 42 and a heat transfer fluid 46 that includes one or more immiscible components 50,54. One or more reflective surfaces 814,818,822 may be disposed within, in contact with or in proximity to at least a portion of films 14,18,22. At least a portion of reflective surfaces 814,818,822 is at least partially reflective or opaque to light and at least partially reflective or opaque to heat.

A lamp 58 may be disposed in the proximity of display 810. With regard to display 810, lamp 58 may be disposed proximally to film 14 and distally to film 18. Similarly, an observer 826 may be located on the same side of display 810 as lamp 58. In this fashion, observer 826 may, also be disposed proximally to film 14 and distally to film 18. Lamp 58 radiates at least a portion of chamber 34 and provides light 830 and heat 834 to at least a portion of fluid 46.

At least a portion of light 830 may be reflected from at least a portion of immiscible components 50,54 (generally indicated by arrow 836) and received by observer 826. In this fashion, display 810 may operate in reflection mode whereby observer 826 may view at least a portion of fluid 46 by reflected light 836.

Alternatively, lamp 58 may provide light 830 and a separate heat source (not shown) may be disposed in the proximity of display 810 and may provide separate heat 838 to enable convection in display 810.

One or more additional observer 842, additional lamp 846 providing additional light 850 and additional separate heat source (not shown) providing additional separate heat 854 may be disposed in the proximity of display 810 and disposed on the opposite side of display 810 relative to that of observer 826, lamp 58 and heat 838.

At least a portion of light 830 may be transmitted through at least a portion of immiscible components 50,54 (generally indicated at 858) and received by additional observer 842. In this fashion, display 810 may operate in transmission mode whereby additional observer 842 may view at least a portion of fluid 46 by the transmission of light 830.

At least a portion of reflective surfaces 814,818,822 and films 14,18,22 may have appropriate optical, thermal and other physical properties such that display 810 may operate generally symmetrically. In this fashion, observer 826 and additional observer 842 may view display 810 in reflection or transmission modes.

At least a portion of immiscible components 50,54 may emit light. By way of example, at least a portion of immiscible components 50,54 may include a fluorescent dye and may be excited and emit visible light when radiated by ultraviolet light from at least a portion of lamp 58 and additional lamp 846.

One possible material for at least a portion of opaque surfaces 814,818,822 includes silvered or metallized Mylar® film. Lamp 58 and additional lamp 846 may include light bulbs, candle flames or the sun. Heat source and additional heat source (both not shown) may include electric heaters, the sun, candle flames or living organisms.

Figure 12:
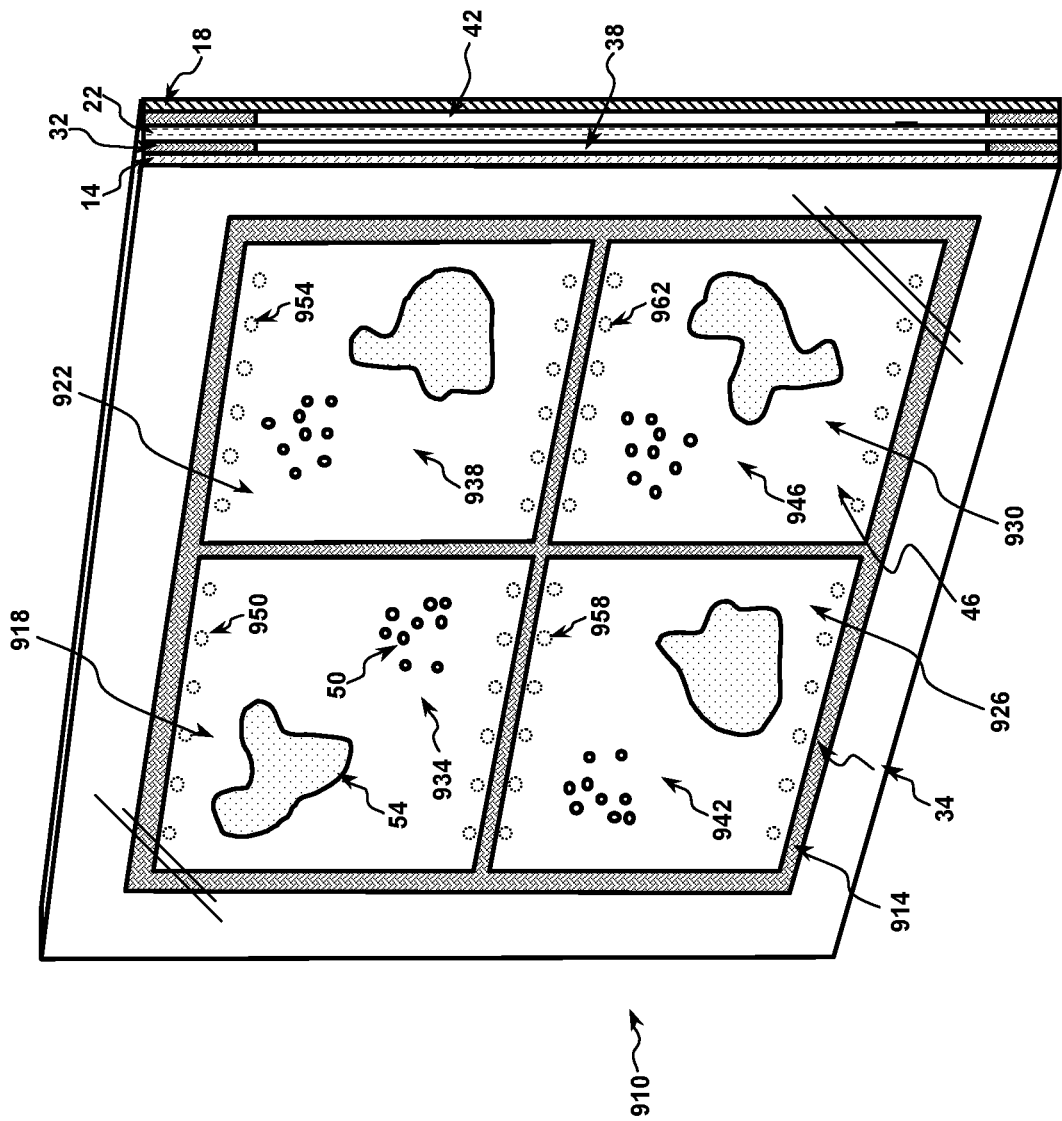
FIG. 12 depicts a laminar liquid motion display that includes an array of chambers.

Referring now to FIG. 12, a depiction is given of a laminar liquid motion display 910 that includes an array of chambers. The same components as in FIG. 1 have the same assigned numbers as in FIG. 1. Display 910 may include a first outer film 14, a second outer film 18, a flow separator film 22, compartments 38,42, one or more border seal 32 (FIG. 2), and a chamber 34 containing a fluid 46 and any number of immiscible components 50,54. Border seal 32 may include a chamber divider seal 914. Chamber divider seal 914 may be disposed within or in contact with chamber 34 and provide a seal between at least a portion of films 14,18,22. Chamber divider seal 914 separates at least a portion of chamber 34 and compartments 38,42 into one or more smaller arrayed chambers 918,922,926,930 and arrayed compartments (not shown). In this fashion, at least a portion of arrayed chambers 918,922,926,930 and arrayed compartments may be hermetically or near-hermetically sealed off from each other. Fluid 46 may be divided into an array of fluids 934,938,942,946. In this fashion, arrayed fluid 934 may be disposed in at least a portion of arrayed chamber 918; arrayed fluid 938 may be disposed in at least a portion of arrayed chamber 922; arrayed fluid 942 may be disposed in at least a portion of arrayed chamber 926 and arrayed fluid 946 may be disposed in at least a portion of arrayed chamber 930. At least a portion of arrayed fluids

934,938,942,946 may be generally identical or different from one another. Arrayed chambers 918,922 may be more easily distinguishable from each other if arrayed fluids 834,938 are made up of a similar chemical composition and each has a generally different color. A number of arrayed chamber flow holes 950,954,958,962 may be disposed in at least a portion of arrayed chambers 918,922,926,930 and enable the circulation of arrayed fluids 934,938,942,946 within at least a portion of arrayed chambers 918,922,926, 930. At least a portion of films 14,18,22 may be dyed, tinted, printed, marked or colored in any fashion so as to help make arrayed chambers 918,922,926,930 more easily distinguishable from each other.

Figure 13:
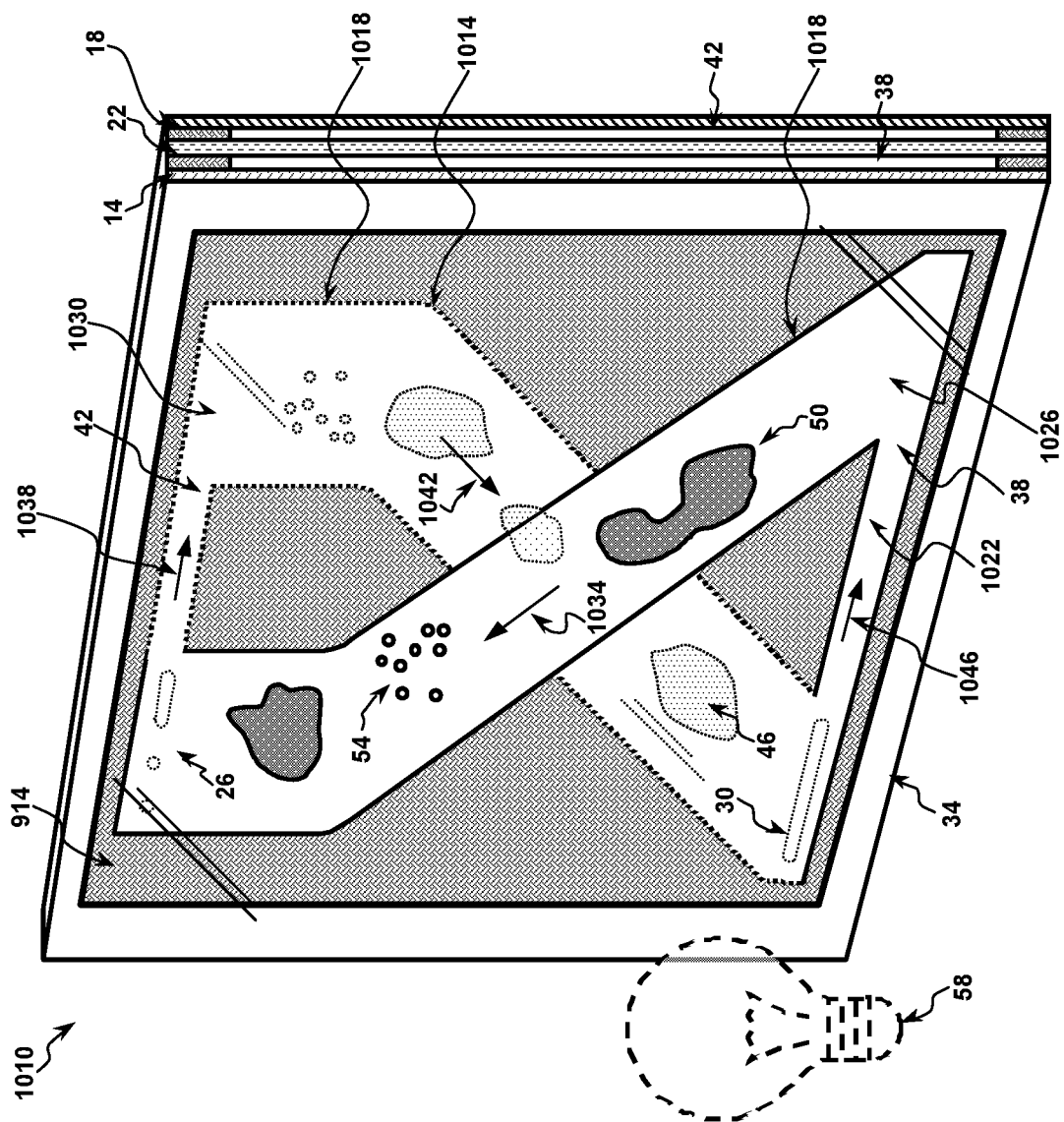
FIG. 13 depicts a laminar liquid motion display that includes an array of chambers disposed in various shapes.

Referring now to FIG. 13, a depiction is given of a laminar liquid motion display 1010 that includes an arrayed chamber disposed in various shapes. The same components as in FIG. 12 have the same assigned numbers as in FIG. 12. Display 1010 may include a first outer film 14, a second outer film 18, a flow separator film 22, one or more upper flow hole 26, one or more lower flow hole 30, compartments 38,42, and a chamber 34 containing a heat transfer fluid 46 that may include any number of immiscible components 50,54. A lamp 58 may be disposed within, in contact with or in the proximity of chamber 34. A chamber divider seal 914 may be disposed within or in contact with chamber 34 and provide a seal between at least a portion of films 14,18,22. Chamber divider seal 914 may include curved sections 1014 and straight sections 1018. Chamber divider seal 914 separates at least a portion of chamber 34 and compartments 38,42 into one or more smaller arrayed chambers (generally indicated generally at 1022) and arrayed compartments 1026,1030.

For example, arrayed compartment 1026 may be disposed proximally to lamp 58 and function as a heat collector. Likewise, arrayed compartment 1030 may be disposed distally to lamp 58 and function as a cooling compartment.

By way of example, the convection cycle for display 1010 may include the following: at least a portion of fluid 46 is heated in arrayed compartment 1026 and flows upward (generally indicated by arrow 1034). At least a portion of fluid 46 flows through upper flow hole 26 and into arrayed compartment 1030 (generally indicated by arrow 1038). At least a portion of fluid 46 cools in arrayed compartment 1030 and flows downward (generally indicated by arrow 1042). At least a portion of fluid 46 flows through lower flow hole 30 and into arrayed compartment 1026 (generally indicated by arrow 1046). At least a portion of fluid 46 is heated or re-heated in arrayed compartment 1026 and flows upward in arrayed compartment 1026 (again, indicated by arrow 1034).

As another example, arrayed compartments 1026,1030 may be disposed in generally tubular shapes and wrapped concentrically around lamp 58 in a fashion similar to that of a solenoidal or toroidal coils or counter-wound coils. Fluid 46, heat and light may be injected into these tubular coil structures to power convection and illuminate fluid 46.

Figure 14:
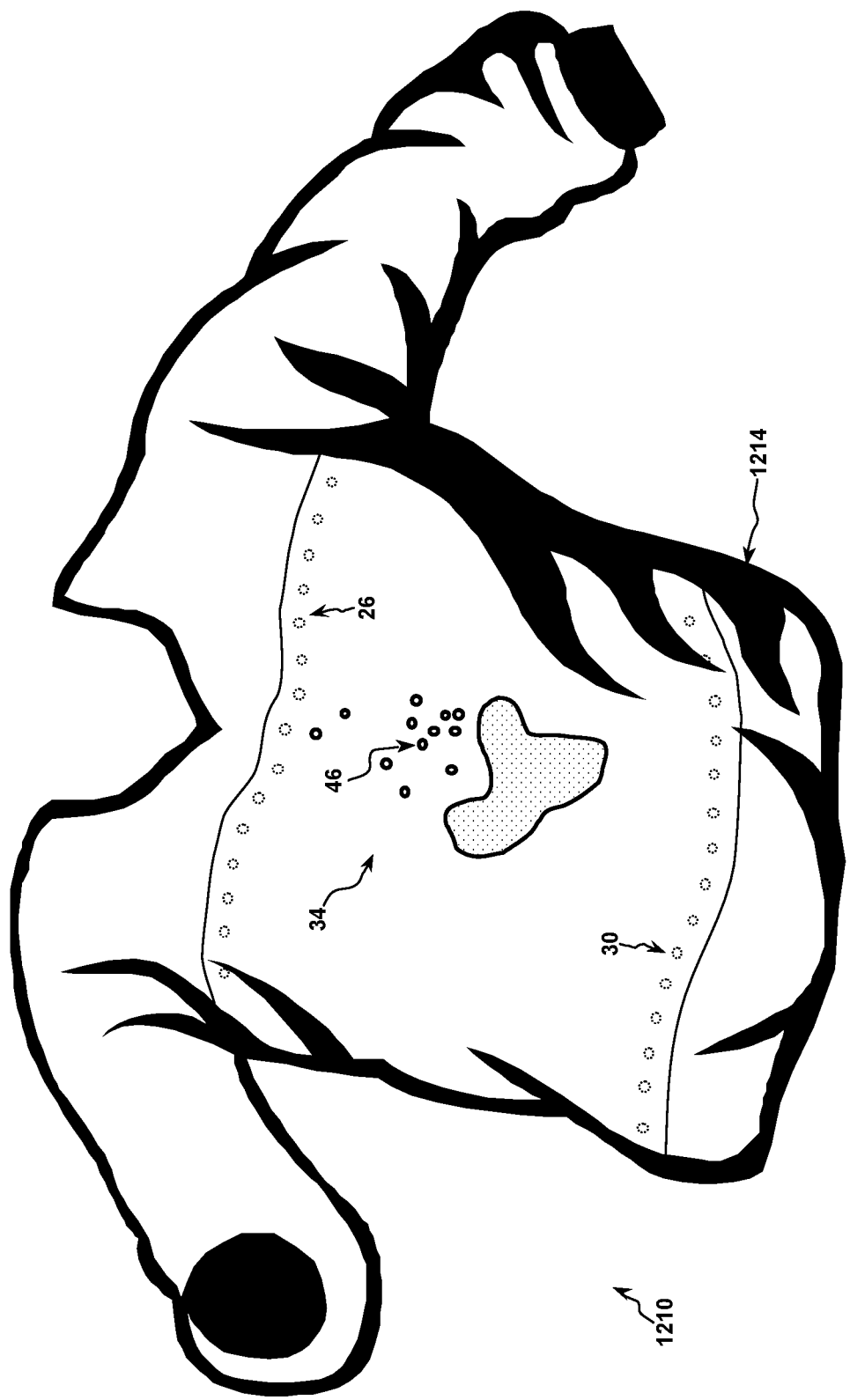
FIG. 14 depicts a laminar liquid motion display that is a part of a garment.

Referring now to FIG. 14, a depiction is given of a laminar liquid motion display 1210 that is a part of a garment. The same components as in FIG. 1 have the same assigned numbers as in FIG. 1. Display 1210 includes a chamber 34 that includes one or more upper flow holes 26, one or more lower flow holes 30, and a heat transfer fluid 46. At least a portion of chamber 34 may be disposed within, in contact with or in the proximity of a garment or a portion of a garment 1214. Garment 1214 may include wearable items such as shirts and hats, and may include fabrics or textiles. Additionally, garment 1214 may also include non-wearable items such as curtains, bedspreads, and other items that may include fabric. Chamber 34 may be attached to garment by sewing, lamination, adhesive, thermal bonding or any other method for attaching fabrics. In this fashion, a heat source (not shown) may be disposed within, in contact with or in the proximity of display 1210 and may include a living person (not shown) that is wearing garment 1214. Likewise, in the case of a non-wearable garment, the heat source may include the sun. Display 1210 may be viewed in reflection mode or transmission mode by illumination from a light source (not shown).

Figure 15:
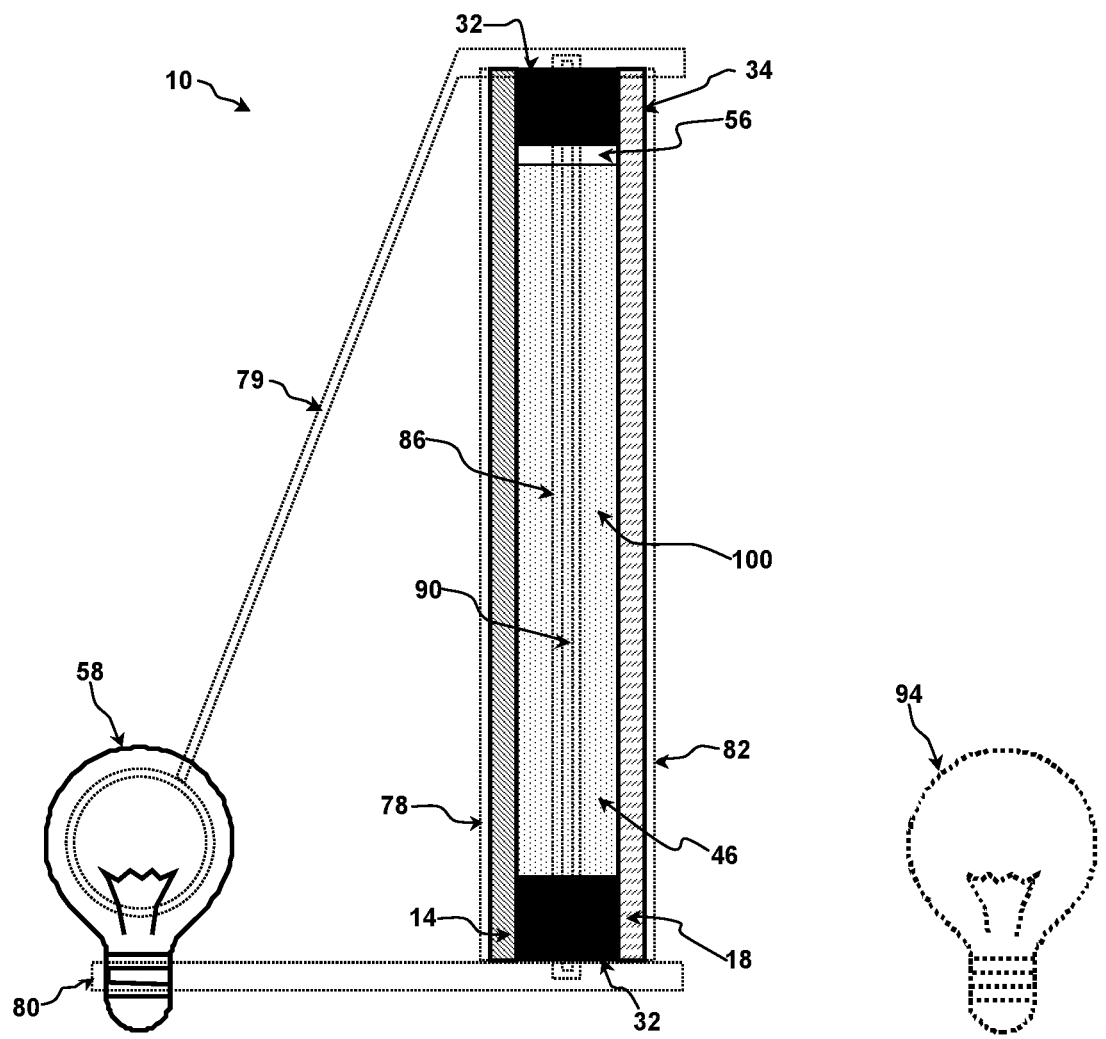
FIG. 15 depicts a laminar liquid motion display that includes a chamber having a single compartment.

Referring now to FIG. 15, a depiction is given of a laminar liquid motion display 10 that includes a chamber having a single-compartment. The same components as in FIG. 1 have the same assigned numbers as in FIG. 1. Display 10 includes a chamber 34 that includes a first outer film 14, a second outer film 18, and a heat transfer fluid 46. A border seal 32 (FIG. 2) binds at least a portion of films 14,18 together along their periphery. In this fashion, chamber 34 includes a single generally thin compartment 100 (FIG. 2). The heat transfer fluid 46 is disposed within chamber 34 and may circulate within chamber 34 and compartment 100. One or more air gaps 56 may be provided in chamber 34 to allow for thermal expansion of fluid 46. A lamp 58 may be disposed in the proximity of chamber 34 to illuminate at least a portion of fluid 46 and to power its motion by convection. Optional support structures 78,79,80,82,86 (FIG. 2) may be disposed within, in contact with or in the proximity of at least a portion of films 14,18 and lamp 58. Additional lamps 90,94 (FIG. 2) may be disposed in within, in contact with or in the proximity of display 10 and may serve to illuminate or enable convection in display 10.

Figure 16:
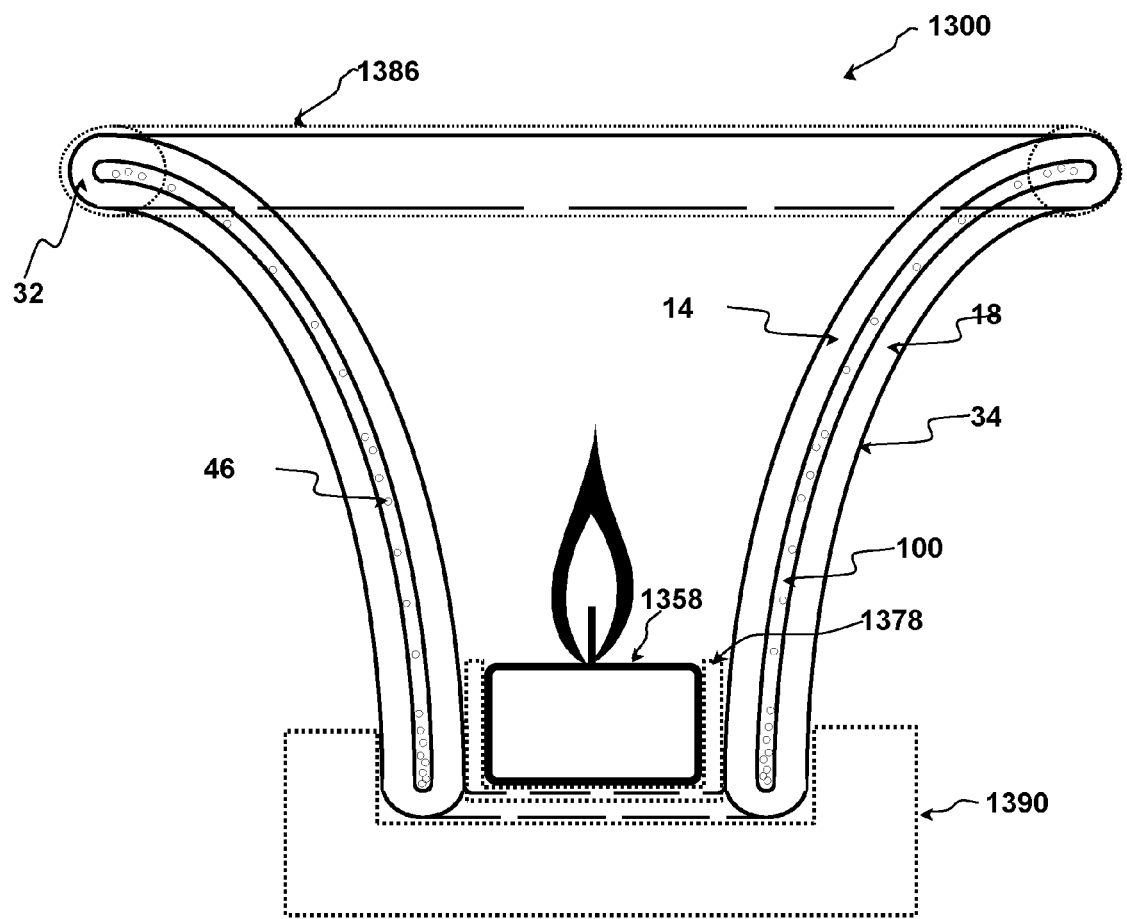
FIG. 16 depicts a laminar liquid motion display that is a part of a candle lamp.

Referring now to FIG. 16, a depiction is given of a laminar liquid motion display 1300 that is part of a candle or candle lamp. Display 1300 includes a chamber having a single-compartment. The same components as in FIG. 15 have the same assigned numbers as in FIG. 15. Display 1300 includes a chamber 34 that includes a first outer film 14, a second outer film 18, and a heat transfer fluid 46. A border seal 32 (FIG. 2) binds at least a portion of films 14,18 together along their periphery. In this fashion, chamber 34 includes a single generally thin compartment 100 (FIG. 2). Chamber 34 may be shaped in a flared tube, cylinder, or any other shape. The heat transfer fluid 46 is disposed within chamber 34 and may circulate within chamber 34 and compartment 100. One or more air gaps (not shown) may be provided in chamber 34 to allow for thermal expansion of fluid 46. One or more candles 1358 may be disposed in the proximity of or attached to chamber 34 to illuminate at least a portion of fluid 46 and to heat and power its motion by convection. Candle 1358 may include candes, tea candles, votive candles, candle lamps, wax candles, oil candles, oil lamps and flicker lamps. Optional support structures 1378, 1386 may be disposed within, in contact with or in the proximity of at least a portion of films 14,18 and candle 1358. Optional support structures 1378, 1386 may serve to provide support to display 1300 and assist in the transfer of heat or light between the candle 1358 and the fluid 46. A base 1390 may be attached to the display 1300 in order to provide added structural support, stability, weight and/or enhanced transfer of heat.

Figure 17:
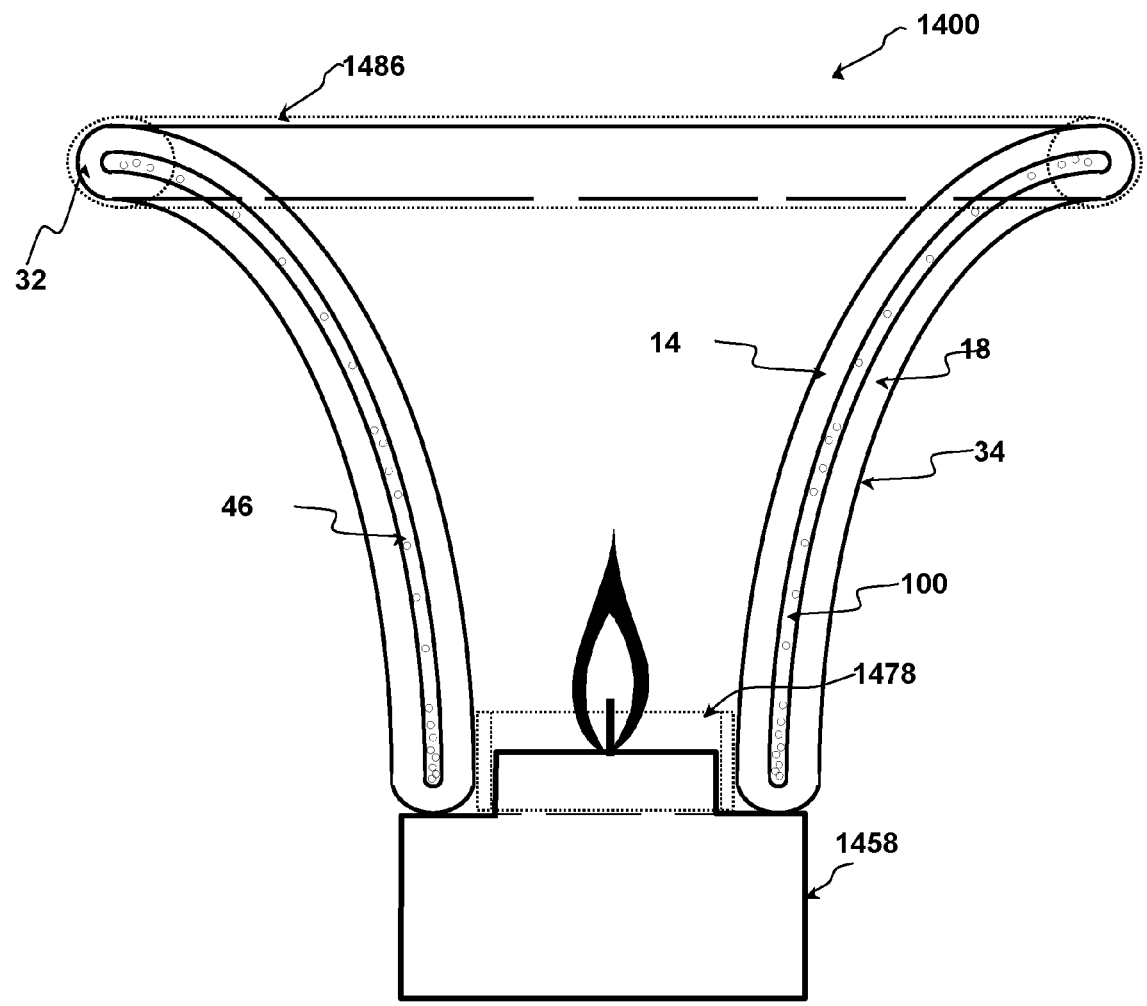
FIG. 17 depicts a modified laminar liquid motion display that is a part of a candle lamp.

Referring now to FIG. 17, a depiction is given of a modified laminar liquid motion display 1400 that is part of a candle or candle lamp. Display 1400 includes a chamber having a single-compartment. The same components as in FIG. 16 have the same assigned numbers as in FIG. 16. Display 1400 includes a chamber 34 that includes a first outer film 14, a second outer film 18, and a heat transfer fluid 46. A border seal 32 (FIG. 2) binds at least a portion of films 14,18 together along their periphery. In this fashion, chamber 34 includes a single generally thin compartment 100 (FIG. 2). Chamber 34 may be shaped in a flared tube, cylinder, or any other shape. The heat transfer fluid 46 is disposed within chamber 34 and may circulate within chamber 34 and compartment 100. One or more air gaps (not shown) may be provided in chamber 34 to allow for thermal expansion of fluid 46. One or more candles 1458 may be disposed in the proximity of or attached to chamber 34 to illuminate at least a portion of fluid 46 and to heat and power its motion by convection. Candle 1458 may include candes, tea candles, votive candles, candle lamps, wax candles, oil candles, oil lamps and flicker lamps. Optional support structures 1478, 1486 may be disposed within, in contact with or in the proximity of at least a portion of films 14,18 and candle 1458. Optional support structures 1478, 1486 may serve to provide support to display 1400 and assist in the transfer of heat or light between the candle 1458 and the fluid 46. A base (not shown) may be attached to the display 1400 or to candle 1458 in order to provide added structural support, stability, weight and/or enhanced transfer of heat.

Although a few specific embodiments of the invention have been described, e.g. with respect to liquid motion displays, the present laminar architecture may be readily adapted to the design of other devices based on laminar convection without departing from the scope of these teachings. Such laminar convective devices include, without limitation, thermosiphons and cooling and/or heating devices for electronics.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A laminar liquid motion display comprising:
a first film, a second film and a border seal forming a closed chamber that is laminar in shape, hermetically sealed, and divided into two or more compartments in fluid communication with each other, wherein the closed chamber is in the shape of a sphere, hemisphere, cylinder, cone, frusto-cone, helix, or mobius strip;
a fluid disposed for fluid motion in the closed chamber among the two or more compartments,
wherein the apparatus is part of a lampshade.

2. A laminar liquid motion display in accordance with claim 1 further including one or more lamps in optical or thermal communication with at least a portion of the chamber and the fluid.

3. A laminar liquid motion display in accordance with claim 1 further including a heat source configured to provide heat to at least a portion of the fluid or the chamber.

4. A laminar liquid motion display in accordance with claim 3 wherein the heat source includes one or more of: the sun, a flame, a candle, an electric heater, a light bulb, a living organism, a living person, an indoor heating system, a lamp, a light source, a laser, or a light emitting diode.

5. A laminar liquid motion display in accordance with claim 1 wherein the motion of the fluid is provided by convection.

6. A laminar liquid motion display in accordance with claim 1 further including a light source configured to provide light to at least a portion of the fluid and the chamber.

7. A laminar liquid motion display in accordance with claim 6 wherein the light source includes one or more of: a lamp, a flame, a candle, a light bulb, a laser, a light emitting diode or the sun.

8. A laminar liquid motion display in accordance with claim 1 wherein the fluid includes one or more of: a suspension, a solution, a colloidal solution, an emulsion, a dispersion, or a mixture.

9. A laminar liquid motion display in accordance with claim 1 wherein the fluid includes two or more immiscible components.

10. A laminar liquid motion display in accordance with claim 9 wherein the immiscible components have similar densities and different coefficients of thermal expansion.

11. A laminar liquid motion display in accordance with claim 1 wherein the fluid includes one or more of: liquids, solids, gases or plasmas, mineral oil, benzyl alcohol, sodium chloride, potassium chloride, salts, liquid paraffin, paraffin wax, paraffin oil, napthene, water, isopropyl alcohol, silicone oil, melamine formaldehyde, nanoparticles, microspheres, fluorescent or phosphorescent liquids solids and gases, polystyrene, superparamagnetic microspheres, magnetic microspheres, paramagnetic microspheres, protein-coated microspheres, acrylic, beads, droplets, glitter, metallic particles, pieces of plastic film, polyester glitter, mineral spirits, xylene, toluene, carbon tetrachloride, dyes, ethanol, surfactants, surface tension reducing agents, solvents, emulsifiers, glycerol, ethylene glycol, polyethylene glycol (aka PEG), plastic, glass, metal and silica, polymer, liquid crystal, dielectric liquid, perfluorinated carbon liquid, anti-freeze or other transparent, translucent, colored, fluorescent, phosphorescent, refractive, diffractive, reflective, absorptive, transmissive, scattering, nonlinear, dispersive, waveguiding, photosensitive, electro-optic, optically rotating, depolarizing, optically active, polarizing, birefringent or opaque materials.

12. A laminar liquid motion display in accordance with claim 1 wherein the first and second films include one or more of the following: thermoplastics, polycarbonate, resins, thermosets, and elastomers, including low- and high-density polyethylene, polypropylene, PIFE, polystyrene, PMMA, nylon, polyester, Mylar®, vinyl, polyvinyl chloride (PVC), acrylic polymer, epoxy, phenolformaldehyde, glass, plastic, transparent polyarylsulfone, polyamide, thermoplastic polyester, polymethylpentene, fluorinated ethylene, propylene polymers, metal, combinations of these materials with each other or with other transparent, translucent, colored, fluorescent, phosphorescent, refractive, diffractive, reflective, absorptive, transmissive, scattering, nonlinear, dispersive, waveguiding, photosensitive, electro-optic, optically rotating, depolarizing, optically active, polarizing, birefringent or opaque materials, or any other plastics or combinations or laminates of plastics or packaging materials including ones that are suitable for forming a hermetic or near-hermetic seal around the fluid.

13. A laminar liquid motion display in accordance with claim 1 wherein the space internal to the chamber has a thickness that is between one micron and one centimeter.

14. A laminar liquid motion display in accordance with claim 1 wherein at least a portion of the chamber further includes one or more of a surface tension breaking object, a heating reservoir, a cooling reservoir, an array of chambers, an array of shaped chambers, flow holes, flow control structures, valves, flaps, nipples, unidirectional valves, nozzles, a surface relief pattern, holograms, holographic film, edge-illuminated films, waveguides, lightguides, surface relief patterns, or films that have been colored, tinted, dyed, patterned, metallized, etched, printed, painted, inscribed or marked in any fashion.

15. A laminar liquid motion display in accordance with claim 1 wherein the first and second films are curved and configured so that the chamber is laminar and the chamber is curved in the form of one or more of: a closed surface, an open surface, a sphere, a hemisphere, a cylinder, a cone, a truncated cone, a helix, or a mobius strip.

16. A laminar liquid motion display in accordance with claim 1 wherein the fluid is colored.

17. A laminar liquid motion display in accordance with claim 1 wherein the fluid includes;
a first immiscible component;
and a second immiscible component;
wherein upon heating at least a portion of the fluid, at least a portion of the first immiscible component rises in relation to a portion of the second immiscible component;
and wherein upon cooling at least a portion of the fluid, at least a portion of the first immiscible component falls in relation to a portion of the second immiscible component.

18. A laminar liquid motion display in accordance with claim 17 wherein one or more of the immiscible components includes microspheres.

19. A laminar liquid motion display in accordance with claim 18 wherein the microspheres include one or more of paraffin, plastic, dye, or polymer.

20. A laminar liquid motion display in accordance with claim 17 wherein one or more of the immiscible components includes one or more of paraffin, plastic, dye, or polymer.

21. A laminar liquid motion display in accordance with claim 17 wherein the closed chamber is configured to facilitate circulation by convection of a first immiscible component of the fluid with respect to a second immiscible component of the fluid.

22. A laminar liquid motion display in accordance with claim 17 wherein the closed chamber is configured to facilitate the motion of a first immiscible component of the fluid,
wherein a portion of the first immiscible component is located in an upper region of the chamber at a level above a portion of the second immiscible component of the fluid,
wherein a portion of the first immiscible component moves to a lower region of the chamber at a level below that of a portion of the second immiscible component,
wherein a portion of the first immiscible component rises back to the upper region of the chamber at a level above a portion of the second immiscible component; and
wherein said motion of first immiscible component of the fluid is driven by convection.

23. A laminar liquid motion display in accordance with claim 1,
wherein the fluid is a filter of light, and wherein the fluid motion results in changes in filtering of light by the fluid.

24. A laminar liquid motion display in accordance with claim 1 wherein the fluid includes microspheres.

25. A laminar liquid motion display in accordance with claim 24 wherein the microspheres include one or more of paraffin, plastic, dye, or polymer.

26. A laminar liquid motion display in accordance with claim 1 wherein the fluid includes one or more of paraffin, plastic, dye, or polymer.

27. A laminar liquid motion display in accordance with claim 1, wherein the fluid includes:
a first immiscible component having a first coefficient of thermal expansion, a first density at a first temperature and a second density at a second temperature;
and a second immiscible component having a second coefficient of thermal expansion, a third density at the first temperature and a fourth density at the second temperature.

28. A laminar liquid motion display in accordance with claim 27, wherein the first coefficient of thermal expansion is greater than the second coefficient of thermal expansion.

29. A laminar liquid motion display in accordance with claim 27, wherein the first density is greater than the second density.

30. A laminar liquid motion display in accordance with claim 27, wherein the third density is greater than the fourth density.

31. A laminar liquid motion display in accordance with claim 27, wherein the first density is greater than the third density.

32. A laminar liquid motion display in accordance with claim 27, wherein the fourth density is greater than the second density.

33. A laminar liquid motion display in accordance with claim 27 wherein the fluid is configured to flow in a chamber;
wherein the internal volume of the chamber has a thickness that is generally between about 1 micron and about 1 centimeter.

34. A laminar liquid motion display in accordance with claim 27 wherein the first, second, third and fourth densities and the first and second coefficients of thermal expansion are chosen such that at least a portion of the fluid or the first or second immiscible component flows by convention when cycled between the first and second temperatures.

35. A laminar liquid motion display in accordance with claim 27, wherein the second temperature is greater than the first temperature.

36. A laminar liquid motion display in accordance with claim 1 wherein an internal volume of the closed chamber is laminar in shape.

* * * * *